US011880173B2

(12) United States Patent
Dosluoglu

(10) Patent No.: US 11,880,173 B2
(45) Date of Patent: Jan. 23, 2024

(54) SYSTEMS AND METHODS FOR ENHANCED CONTROL OF ELECTRONIC CIRCUITS

(71) Applicant: 5G3I Ltd, London (GB)

(72) Inventor: Taner Dosluoglu, Glasgow (GB)

(73) Assignee: 5G3I Ltd, London (GB)

(*) Notice: Subject to any disclaimer, the term of this patent is extended or adjusted under 35 U.S.C. 154(b) by 0 days.

(21) Appl. No.: 17/924,766

(22) PCT Filed: Aug. 12, 2021

(86) PCT No.: PCT/GB2021/052088
§ 371 (c)(1),
(2) Date: Nov. 11, 2022

(87) PCT Pub. No.: WO2022/038338
PCT Pub. Date: Feb. 24, 2022

(65) Prior Publication Data
US 2023/0185256 A1    Jun. 15, 2023

Related U.S. Application Data

(60) Provisional application No. 63/066,419, filed on Aug. 17, 2020.

(51) Int. Cl.
*G05B 13/04* (2006.01)
*G05B 13/02* (2006.01)
(Continued)

(52) U.S. Cl.
CPC ......... *G05B 13/048* (2013.01); *G05B 13/021* (2013.01); *G05B 13/027* (2013.01);
(Continued)

(58) Field of Classification Search
CPC ....... G06F 1/26; G05B 13/021; G05B 13/027; G05B 13/048; G05B 13/0265
(Continued)

(56) References Cited

U.S. PATENT DOCUMENTS 5,268,835 A * 12/1993 Miyagaki ........... G05B 13/0285
706/900
5,477,444 A * 12/1995 Bhat .................... B01J 19/0033
700/48
(Continued)

FOREIGN PATENT DOCUMENTS

EP           3693798 A1      8/2020
WO    WO-2018217903 A1 * 11/2018 .............. B22F 10/00
WO     WO-2021155156 A1     8/2021

OTHER PUBLICATIONS

Kelperis, K.; International Search Report and Written Opinion; PCT/GB2021/052088; dated Nov. 24, 2021; 10 pages.
(Continued)

*Primary Examiner* — Ronald D Hartman, Jr.
(74) *Attorney, Agent, or Firm* — Bradley Arant Boult Cummings LLP

(57) ABSTRACT

Circuit operation is improved through application of artificial intelligence to optimize circuit control. This can provide dynamic and intelligent supply regulation for power supplies which has particular advantages for the Internet of Things and other similar areas which require circuits to be used in different environments or with widely varying energy sources.

19 Claims, 25 Drawing Sheets

(51) Int. Cl.
*G06F 1/26* (2006.01)
*H02M 3/156* (2006.01)

(52) U.S. Cl.
CPC ........... *G05B 13/0265* (2013.01); *G06F 1/26* (2013.01); *H02M 3/156* (2013.01)

(58) Field of Classification Search
USPC .......................................................... 700/47
See application file for complete search history.

(56) References Cited

U.S. PATENT DOCUMENTS

| | | | |
|---|---|---|---|
| 6,078,843 A | | 6/2000 | Shavit |
| 6,725,208 B1 * | | 4/2004 | Hartman .............. G05B 13/027 706/23 |
| 2012/0117011 A1 * | | 5/2012 | Hashimoto ......... F02D 13/0226 706/23 |
| 2015/0094850 A1 | | 4/2015 | Passot et al. |
| 2016/0333855 A1 | | 11/2016 | Lund et al. |
| 2017/0261949 A1 * | | 9/2017 | Hoffmann ................ G06N 7/01 |
| 2018/0284703 A1 * | | 10/2018 | Sonoda .................... G05B 6/02 |
| 2019/0050729 A1 * | | 2/2019 | Lakshmanan .......... G06N 3/063 |
| 2019/0286099 A1 | | 9/2019 | Satou et al. |
| 2019/0332918 A1 * | | 10/2019 | Gómez Gutiérrez ........................ G05B 13/048 |
| 2020/0026246 A1 | | 1/2020 | Nakagawa |
| 2020/0050178 A1 | | 2/2020 | Gao et al. |
| 2020/0103878 A1 * | | 4/2020 | SayyarRodsari .... G05B 13/042 |
| 2020/0240662 A1 | | 7/2020 | Picardi et al. |
| 2020/0348628 A1 * | | 11/2020 | Hoffmann ........... G06F 16/2358 |
| 2021/0359577 A1 * | | 11/2021 | Funk ........................ G06N 3/08 |

OTHER PUBLICATIONS

Kelperis, K.; International Preliminary Report on Patentability; PCT/GB2021/052088; dated Jul. 25, 2022; 7 pages.
Patent Cooperation Treaty, International Application No. PCT/GB2022/051992, "International Search Report," dated Dec. 12, 2022, 3 pages.
Patent Cooperation Treaty, International Application No. PCT/GB2022/051992, "Written Opinion of the International Searching Authority," dated Dec. 6, 2022, 11 pages.
Patent Cooperation Treaty, International Application No. PCT/GB2022/051992, "Written Opinion of the International Preliminary Examining Authority," dated Jun. 28, 2023, 14 pages.

* cited by examiner

| SW | 0 | 1 | 2 | 3 | 4 | 5 | 6 | 7 | 8 | ... | 15 | 16 | 17 | 18 | 19 | 20 | 21 | 22 | 23 | ... | 30 | 31 |
|---|---|---|---|---|---|---|---|---|---|---|---|---|---|---|---|---|---|---|---|---|---|---|
| L3 | 1 | 1 | 1 | 1 | 1 | 1 | 1 | 1 | N | N | N | N | N | N | N | N | N | N | N | N | N | N |
| L2 | N | N | N | N | N | N | N | N | N | N | N | 1 | 1 | 1 | 1 | 1 | 1 | 1 | 1 | N | N | N |
| PX | x | x | x | x | x | x | x | x | x | x | x | x | x | x | x | x | x | x | x | x | x | x |
| | | | | | | | | | | | | 25% DC | | | | | | | | | | |
| | | | | | | | | | | | | 25% DC | | | | | | | | | | |

*Figure 24*

| SW | 0 | 1 | 2 | 3 | 4 | 5 | 6 | 7 | 8 | ... | 12 | 13 | 14 | 15 | 16 | 20 | ... | 27 | 28 | 29 | 30 | 31 | |
|---|---|---|---|---|---|---|---|---|---|---|---|---|---|---|---|---|---|---|---|---|---|---|---|
| L1 | 0 | 0 | 0 | 0 | 1 | 1 | 1 | 1 | N | N | N | N | N | N | N | 0 | 0 | 0 | 0 | 0 | 0 | 0 | 25% DC |
| L2 | 0 | 0 | 0 | 0 | 0 | 0 | 0 | 0 | 0 | 0 | 1 | 1 | 1 | 1 | N | N | N | N | 0 | 0 | 0 | 0 | 25% DC |
| PX | x | x | x | x | x | x | x | x | x | x | x | x | x | x | x | x | x | x | x | x | x | x | 8 bit |

*Figure 25*

SYSTEMS AND METHODS FOR ENHANCED CONTROL OF ELECTRONIC CIRCUITS

TECHNICAL FIELD

The present disclosure relates to systems and methods for enhanced control of electronic circuits, and in particular to controllers for electronic circuits which have controllable components, where the controllers are used to adjust the controllable components for correct provision of a desired functionality.

BACKGROUND

As shown in FIG. 1, a system 100 may comprise a circuit 104 that provides a functionality 106 such as an output of a voltage or power for a load or other such device. Many electronic circuits have components which can be controlled, such as variable resistors, programmable gain amplifiers, or active components which function as controlled voltage or current source, examples of such active components being switching devices such as transistors.

Circuits 104 of this type can be provided with circuit control 102, namely a device which provides control signals or commands to vary the parameters and operation of the circuit's controllable components. The circuit control may operate via an interface for a user or another machine component of the system.

The circuit control 102 may comprise a controller, such as a microprocessor, microcontroller or other integrated control circuit, which may in a known manner provide control signals of specific formats for adjusting the operation of the circuit 104 for correct operation of the functionality 106. A microprocessor or microcontroller may itself be part of a wider system on-chip (SoC) or be provided as a dedicated integrated circuit.

Arrangements of this type are found in many different contexts. However, they are usually designed for well controlled single use cases, and it is difficult to maintain precise control of the functionality 106 of a circuit 104 if it is to be reused in a wide range of different use cases, or if its intended use case involves operating in a wide variety of different environmental conditions or if it is to be used within different systems and/or operated with different power supplies. In addition, circuits 104 of this type can struggle to deal with transitions in supply loads or with challenging parasitic inductances and/or capacitances in the system 100.

SUMMARY

There is a need for enhanced control of electronic circuits with active or other controllable components, and it is an object of the disclosure to address various limitations including one or more of the limitations discussed above.

According to a first aspect of the disclosure, there is provided a system comprising:
- an electronic circuit with one or more controllable components and which provides a functionality; and
- a circuit control for providing control signals for operating the controllable components;
- wherein said circuit control comprises a controller and an artificial intelligence component which cooperate to provide the control signals.

Optionally, the controller and artificial intelligence component are provided as part of the same integrated circuit.

Optionally, the artificial intelligence component monitors the performance of the functionality and feeds that back to the circuit control.

Optionally, the circuit providing the functionality is provisioned with one or more supplementary control elements which can be controlled by the circuit control or by a component external to the system to modify the functionality.

Optionally, the system further comprises a predictor unit that estimates a state of the system.

Optionally, the artificial intelligence component comprises a neural network.

Optionally, the neural net is trained during start up of a circuit.

Optionally, the neural net is trained on simulation data of expected scenarios.

Optionally, the neural net is trained in-situ during the operation of the circuit in a circular fashion, optionally with fixed time periods, alternating such that one set of data is collected, the second set of data is used for training, and third set of data is applied to the control which was previously collected and used for training during the previous time period.

Optionally, the neural net comprises a deep learning architecture with purpose driven hidden layers handling state transitions and control of the circuit.

Optionally, the electronic circuit may be a power supply circuit and the functionality is to provide a controlled power output for a load.

Optionally, the system comprises a physical copy of the system and a digital twin of the physical copy, wherein the physical copy and the digital twin are configured to exchange data between each other.

Optionally, the digital twin receives one or more data from the physical copy of the artificial intelligence component of the circuit control.

Optionally, the digital twin is configured to determine what changes should be applied by the supplementary control elements to modify the functionality.

According to a second aspect of the disclosure there is provided a cyber-physical system, the system comprising a physical system and a digital twin of the physical system, wherein the physical system and the digital twin are configured to exchange data between each other; and the physical system comprises: an electronic circuit with one or more controllable components and which provides a functionality; and a circuit control for providing control signals for operating the controllable components; wherein said circuit control comprises a controller and an artificial intelligence component which cooperate to provide the control signals.

Optionally, the digital twin receives one or more data from the artificial intelligence component of the circuit control.

Optionally, the circuit providing the functionality is provisioned with one or more supplementary control elements which can be controlled by the circuit control or by a component external to the system to modify the functionality.

Optionally, the digital twin is configured to determine what changes should be applied by the supplementary control elements.

The system of the second aspect may also be provided with further features as mentioned for the other aspects and as disclosed herein.

According to a third aspect of the disclosure, there is provided, in an electronic system, a method of controlling a circuit by providing control signals to one or more controllable components, where said control signals are provided by a circuit control which comprises a controller and an artificial intelligence component which cooperate to provide the control signals.

The method of the third aspect may further comprise steps or providing or using features of the first and second aspect, and include other steps as described herein.

According to a fourth aspect of the disclosure, there is provided a power supply circuit which comprises a controller and an artificial intelligence component which cooperate to optimize the operation of the power supply circuit.

The power supply circuit of the fourth aspect may also be provided with further features as mentioned for the other aspects and as disclosed herein.

According to a fifth aspect of the disclosure, there is provided a circuit for a voltage regulator, comprising; an input node connected to a first switch having a first side connected to an input voltage and a second side connected to the input node; an input capacitor having a first side connected to the input node and a second side connected to a first switching node; a second switch having a first side connected to the first switching node and the second side connected to ground; a first inductor having a first side connected to the first switching node and a second side connected to the output node; a third switch having a first side connected to the input node and a second side connected to a second switching node; a fourth switch having a first side connected to the first switching node and a second side connected to ground; a second inductor having a first side connected to the second switching node and a second side connected to the output node; a fifth switch with digital code controlled gate having the switch connected between the input node and output node where the digital code determines the on resistance of the switch; a sixth switch having a first side connected to the second switching node and a second side connected to the output node; a seventh switch having a first side connected to the first switching node and a second side connected to the output node.

According to a sixth aspect there is provided cascaded voltage regulators where an output node of a first regulator is connected to an input node of a second regulator where first regulator is voltage regulator of the fourth aspect and a second regulator is voltage regulator of the fourth aspect except that the first switch is omitted.

Optionally, an on resistance of the fifth switch of the first regulator and the voltage measurement of input and output nodes are used to calibrate the component value of the output capacitor of the first regulator with all the switches set appropriately as follows; each of the first switch, second switch, third switch, fourth switch of the first regulator are off; each of the sixth switch, seventh switch of the first regulator are on; the first switch of the second regulator is omitted; each of the second switch, fourth switch, sixth switch, seventh switch of the second regulator are on; each of the third switch, fifth switch of the second regulator are off.

Optionally, the on resistance of fifth switch of the second regulator and the voltage measurement of input and output nodes are used to calibrate the component value of the output capacitor of the second regulator with all the switches set appropriately as follows; each of the first switch, second switch, third switch, fourth switch, fifth switch of the first regulator are off; each of the sixth switch, seventh switch of the first regulator are on; the first switch of the second regulator is omitted; each of the sixth switch, seventh switch of the second regulator are on; and each of the second switch, third switch, fourth switch of the second regulator are off.

Optionally, the inductor values of the first and second regulators are calibrated during start-up operation following the calibration of capacitor values.

The fifth and sixth aspects may also be provided with further features as mentioned for the other aspects and as disclosed herein.

It will be appreciated that the systems and methods disclosed herein may be embodied in non-transitory form as instructions provided as software, firmware, hardware or a mixture. Novel processors and applications may be provided to implement the disclosure and to provide tangible improvements in the operation of circuits or to provide novel circuit structures as described herein.

BRIEF DESCRIPTION OF THE DRAWINGS

The disclosure is described in further detail below by way of example only and with reference to the accompanying drawings, in which:

FIG. 24 is a table illustrating a possible time sequence for operating the two cascaded regulators of FIG. 7 in continuous current mode; and FIG. 25 is a table illustrating a possible time sequence for operating the two cascaded regulators of FIG. 7 in discontinuous current mode.

DETAILED DESCRIPTION

Figure 1:
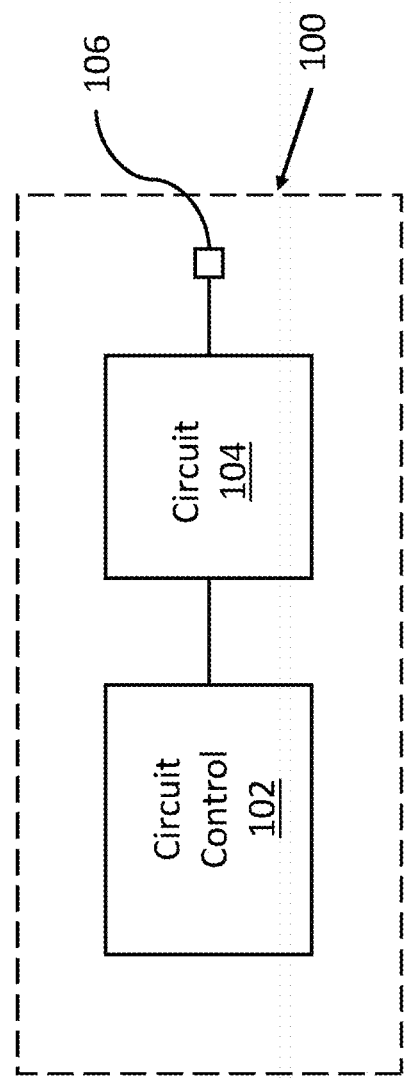
FIG. 1 illustrates a prior art electronic system.
Figure 2:
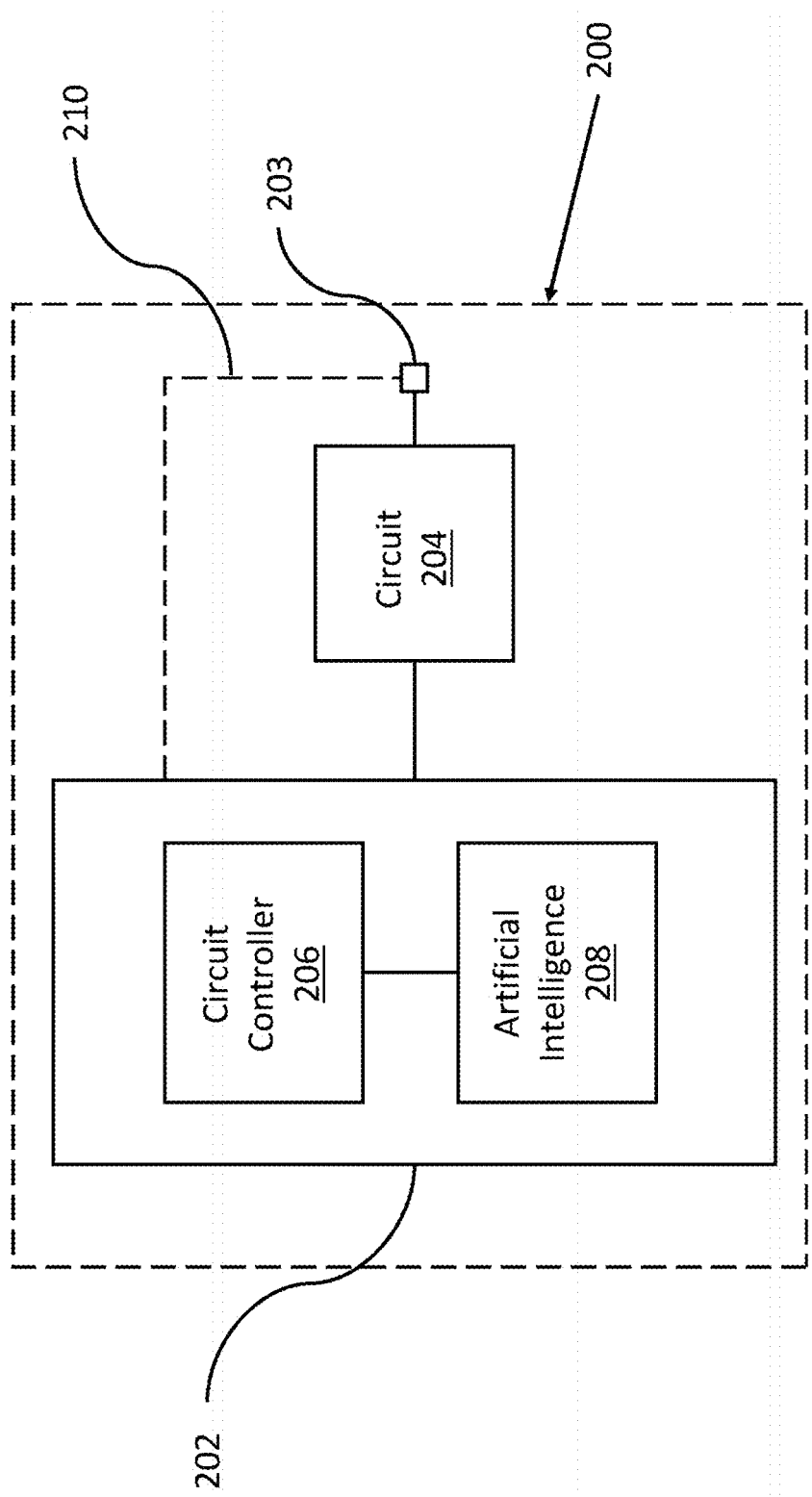
FIG. 2 illustrates a system according to the present disclosure.

According to the disclosure, control of electronic circuits can be enhanced through the use of artificial intelligence. As shown in FIG. 2, a circuit control 202 according to the invention comprises a circuit controller 206 and an artificial intelligence component 208, which act together to provide one or more inputs to a circuit 204 which provides a functionality 203.

An artificial intelligence component is a device which receives inputs representative of the state of a system, and makes decisions based on its inputs which are designed to achieve a particular goal.

An artificial intelligence component according to the disclosure may also comprise or make use of machine learning, deep learning and unsupervised machine learning. Here, a machine learning component is configured to execute an algorithm which improves its operation automatically through experience, and machine learning refers in general to techniques which use such automated self-learning techniques. Deep learning is a class of machine learning that uses multiple layers to successively extract higher level features from the raw input. Unsupervised learning is a type of machine learning that looks for previously undetected patterns in a data set with no pre-existing labels and with a minimum of human supervision. The present disclosure may also where appropriate make use of supervised learning that makes use of human-labelled data, semi-supervised learning which has a mixture of human-labelled and unlabelled data, reinforcement learning which acts to maximize a cumulative award, or any other machine learning method as appropriate.

In FIG. 2, the controller 206 and artificial intelligence component 208 are illustrated as two separate components to reflect the logical functionality of these parts of the disclosure. However, it will be appreciated that the two components may either be physically integrated with each other as part of the same integrated circuit, or provided as different integrated circuits within a wider system.

It is also to be appreciated that there may be tighter integration between the circuit control 202 and the circuit 204; they may be provided as combined components in a single system on chip, or there may be additional components provided in a hybrid structure. For example, a further circuit could be provided which can execute embedded code. It could be provided with a regulated supply from a main circuit; and could optionally itself form part of the artificial intelligence component.

It will also be appreciated that, where different physical components are provided, they may be formed using the same or different semiconductor process technology.

Figure 3:
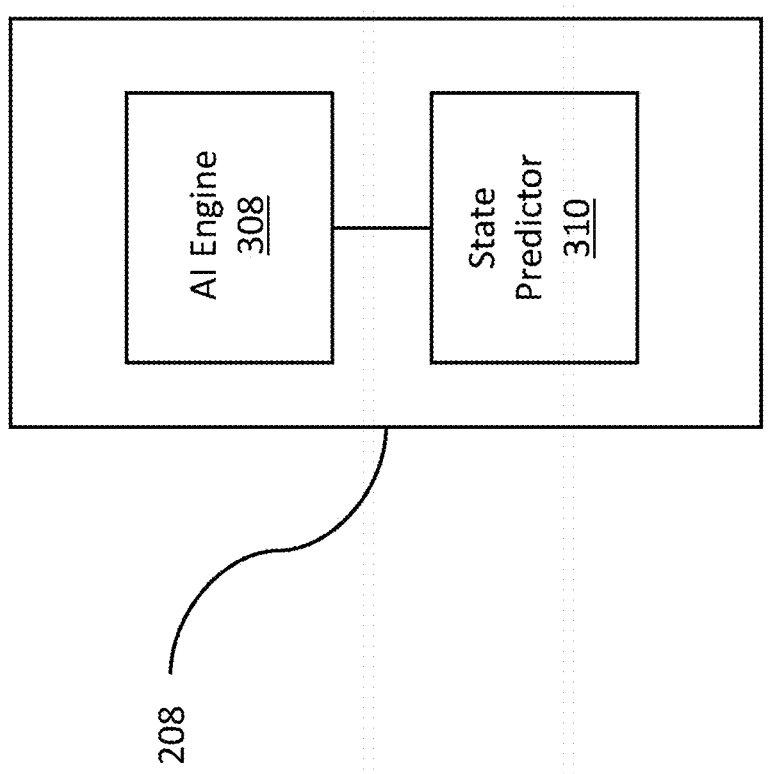
FIG. 3 illustrates aspects of an artificial intelligence component that may be used with the system of FIG. 2.

FIG. 3 shows an embodiment of an artificial intelligence unit 206 which comprises an artificial intelligence (AI) engine 308 and an optional state predictor 310, which functions as set out below.

Figure 4:
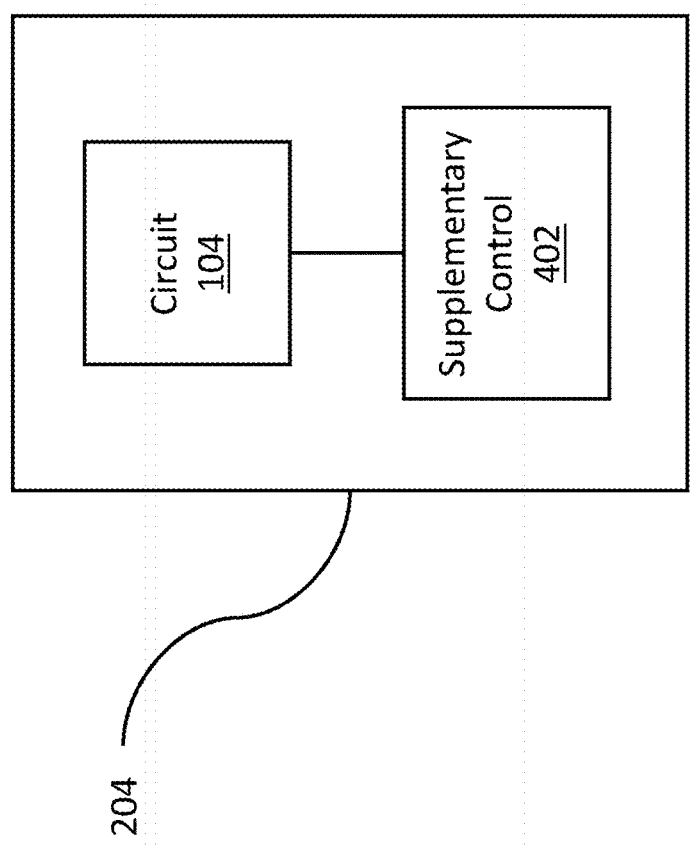
FIG. 4 illustrates aspects of modified circuit that may be used with the system of FIG. 2.

Further, it is possible in certain embodiments for the circuit 204 to be modified to include additional supplementary control. FIG. 4 shows an embodiment of this where a circuit 104 of the prior art is supplemented by one or more supplementary control elements 402. The supplementary control elements 402 may be in the form of additional control devices or other inputs that provide additional functionality as compared to the regular functionality of a prior art circuit 104. Again, FIG. 4 is of a schematic nature, and it will be appreciated that in the majority of cases circuit 104 and supplementary control 402 will be combined as a single integrated circuit, so supplementary control 402 will in most cases be provided by a selection of components forming part of the overall circuit.

Figure 22:
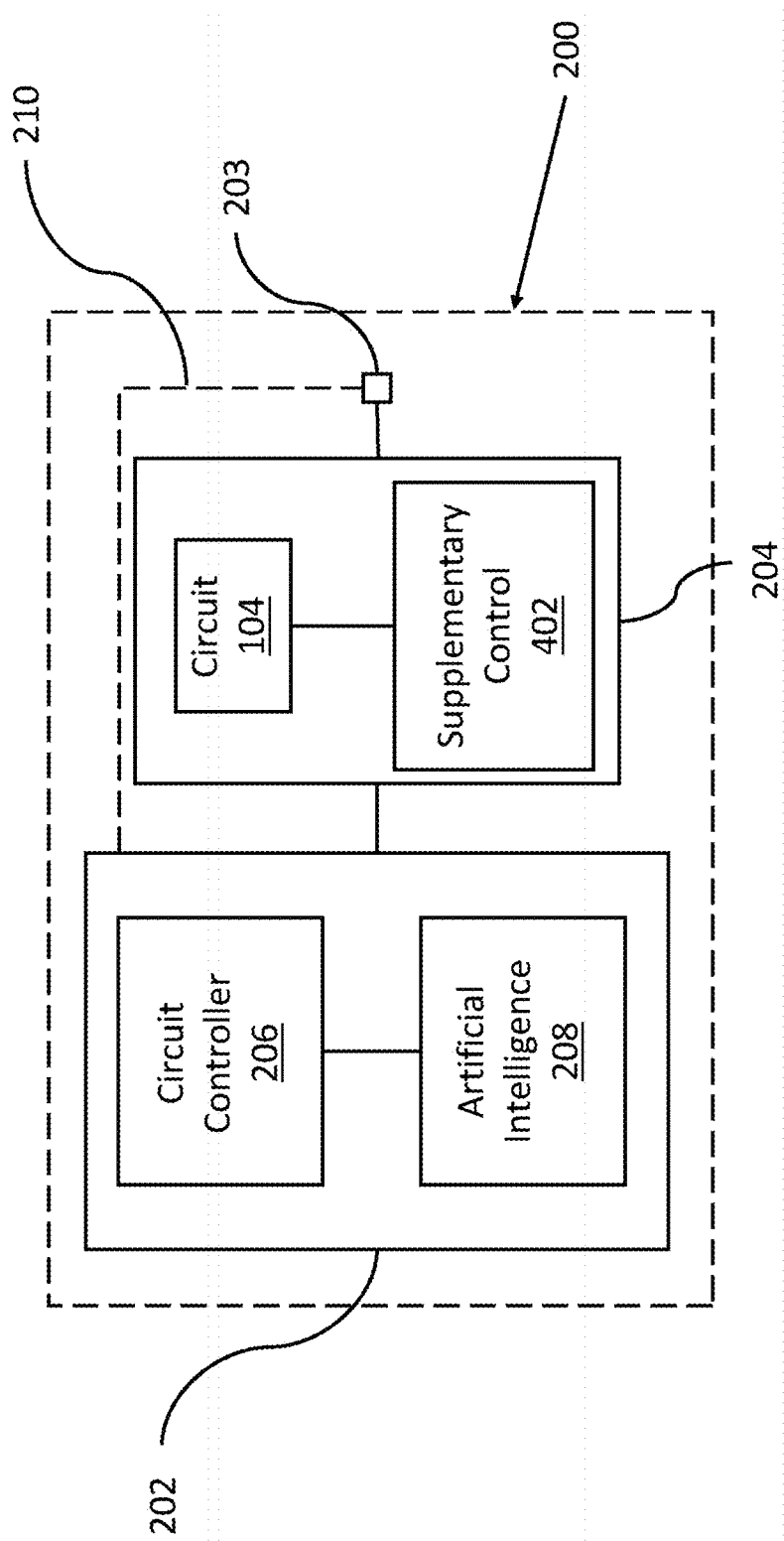
FIG. 22 is a schematic diagram of an embodiment of the system of FIG. 2 provided with the optional features of FIG. 3 and FIG. 4.

It will be appreciated that the optional features of the artificial intelligence 208 as shown in FIG. 3 may be provided with or without the optional features of the supplementary control 402 of FIG. 4 of the circuit 204, and vice versa. FIG. 22 shows an example embodiment in which the circuit 204 of the system 200 is provided with the optional features of the artificial intelligence 208 of FIG. 3 and the supplementary control circuit 402 of FIG. 4.

Also, as shown in FIG. 2, there is an optional feedback 210 provided between the output functionality 203 and the circuit control 202. In embodiments where the optional feedback 210 is provided the circuit controller 206 may also be referred to as a closed-loop controller. The feedback 210 can be used to provide parameters for the circuit control 206 and/or the artificial intelligence component 208, such as information related to the functionality 203 and other circuit, system or environment data. Information exchanged via the feedback path 210 may include, for example, voltage and current values at the output of the circuit 204 or from other places in the wider system 200. The parameters may also include other information including system-wide information such as the run state of a component using the functionality 203, clock speed and other relevant information such as the status or contents of memory buffer stacks.

The artificial intelligence component 208 may include a neural network that can receive these parameters as inputs and determine an anticipated behaviour of the functionality 203 as well as transient i.e. short-term duration, changes in state which may apply to it.

The neural network may be configurable and scalable and may utilise machine learning based on simulations of anticipated operations or behaviours including unexpected changes and transitions of input states. A deep learning architecture may be provided with purpose driven hidden layers handling state transitions as well as control of the circuit 204 and/or supplementary control elements 402.

Simulation data may be used to train the neural network. Where a state predictor 310 is provided, this may include functionalities such as a Kalman filter, or the like, used to train the neural network.

The artificial intelligence engine 208 may suitably provide state estimation as an output and use extended Kalman filter coefficients and a state machine to determine the most likely state of the system.

It is well known that for various types of circuits 104, 204, the behaviour during start-up of a circuit is different from that which occurs during steady state operation. This is particularly the case for circuits such as power regulators where start-up conditions can affect the voltage and/or current at a regulated output. The present disclosure may in some embodiments include a neural network provided as part of the artificial intelligence component 208 which can be trained during a start-up operation and optionally for a set period after stable operation is achieved. This also means that no previous training is required, and training can be done under real use case scenarios with actual circuit components and the process dependent device parameters.

In some embodiments the circuit controller 206 is a closed-loop controller and the supplementary control 402 can be used to change the state of the circuit controller 206 without taking the circuit offline. This includes changes that would otherwise cause discontinuity in the closed-loop control system.

The artificial intelligence 208 may act on the closed-loop controller 206 or it may act on the circuit 104 independently of the closed loop controller 206.

In some embodiments both the artificial intelligence 208 and the supplementary control 402 can act on the circuit 104 and the controller 206 but whilst the artificial intelligence 208 is trained with data extrapolated from the circuit 104 and circuit controller 206, the supplementary control 402 is configured to act independently of the circuit 104 and the controller 206. The supplementary control 402 may itself comprise an artificial intelligence component which is trained independently of the circuit controller 206 and circuit 104.

In operation, the closed-loop controller 206 receives in input via the feedback 210 a measured error which is impacted by the circuit as well as by external conditions (loads, supplies, etc). The controller 206 then controls the circuit 104 based on the measured error.

The circuit controller 206 is configured to work in various configurations and states that also determines the closed-loop control. For example, in one specific embodiment the circuit 104 is a power circuit and the controller 206 configuration/state changes include applying forced changes to the number of phases, transitions from a continuous current mode (CCM) to a discontinuous current mode (DCM) of operation, forced standby etc. These changes can be applied by the AI component 208 or directly via the system interface. Note that these adjustments change the state of the circuit controller 206 and its continuous closed-loop control. The controller can later make changes to its own configuration/state based on the "measured error".

The disclosure has many implications for process automation and predictive control implementations via the use of cyber-physical systems, i.e. physical systems and their cyber copy, or digital twin. A digital twin is a virtual representation of a physical system, such as a circuit, a machine or even a whole factory, that spans its lifecycle. The digital twin of a physical system is updated from real world data of its physical counterpart. Digital twins are becoming more and more common in the field of process automation and predictive control thanks to the rapid evolution of the Internet-of-Things, which allows to gather large amounts of data from physical systems throughout their lifecycle.

Figure 23:
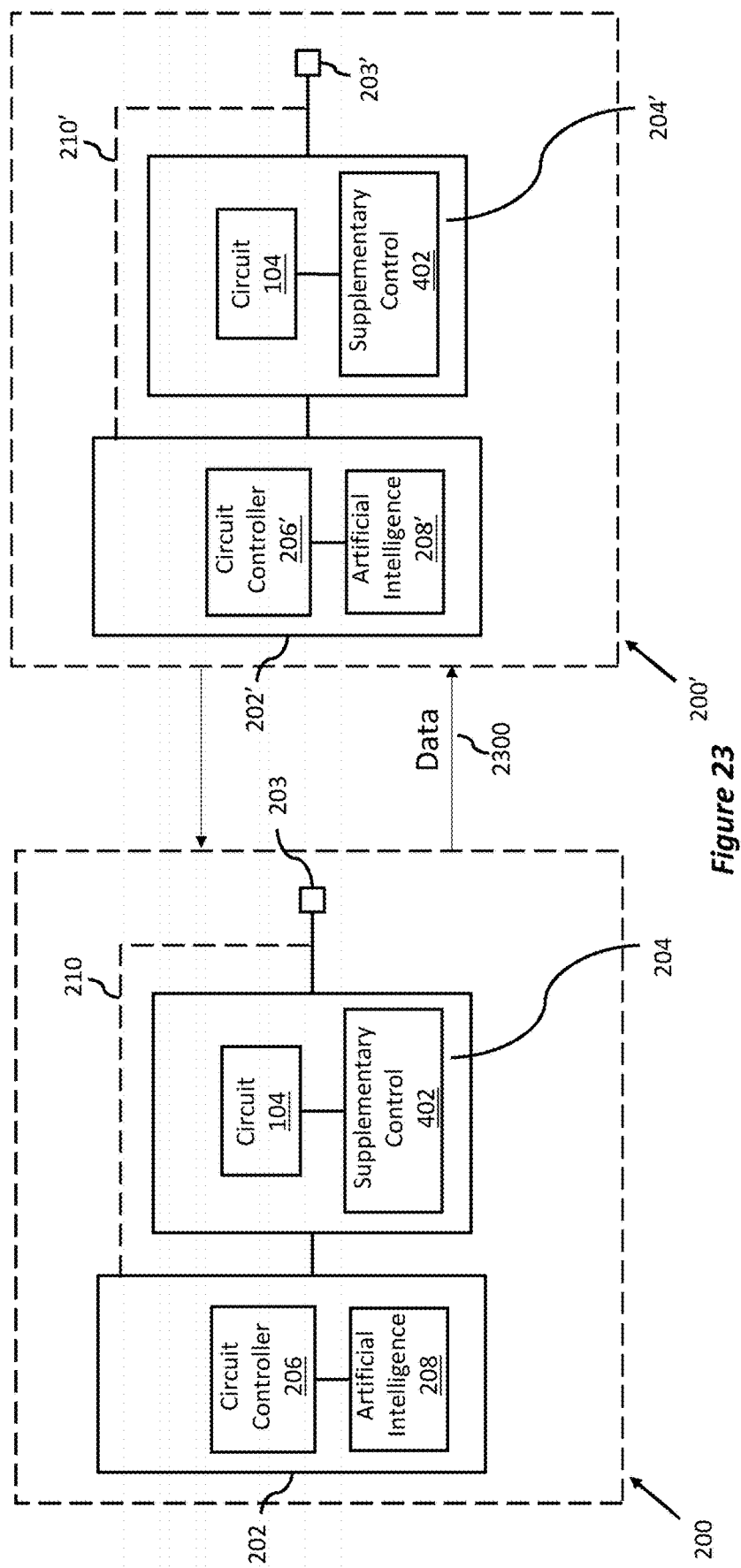
FIG. 23 is a schematic diagram illustrating an embodiment of a cyber-physical system according to the present disclosure.

FIG. 23 is a schematic diagram illustrating an embodiment of a cyber-physical system according to the present disclosure. The cyber-physical system 2300 comprises the system 200 of FIG. 22 (also referred to as "the physical system" and a digital twin 200' of the physical system 200. The digital twin 200' and the physical system 200 are configured to exchange data with each other. In particular, the digital twin 200' is fed data 2300 from the physical system 200.

The artificial intelligence 208 may be configured to integrate information derived from artificial neural network backpropagation and model predictive control such that the controller 206 adjusts its parameters and behaviour to achieve the best desired performance of circuit 104. In this case the physical system's data read by the supplementary control 402 already embed the effects of the neural network backpropagation and model predictive control and the error-data observed by the supplementary control 402 provide the errors which are due to: limitations of the circuit controller 206 (for example to bandwidth/power constraints of the circuit or higher order dynamics), changes in operating conditions including load transients that have not been predicted (including component failure, malicious side-channel attack, etc.) as well as measurement errors and/or noise in the system.

The supplementary control circuit 402 may be configured to act on the circuit 104 to compensate for such limitations without impacting the behaviour of the circuit controller 206; that is, the supplementary control 402 may substantially be configured to act in parallel with the main circuit controller 206 to compensate for deficiencies of the controller 206.

Any change to be implemented in the supplementary control 402 (which in turn will affect the circuit 104) can be determined (modelled and simulated) in the digital twin 200' before they are implemented in the physical system 200. The physical system's data provided by the supplementary control 402 during the lifecycle of the physical system can be provided to the supplementary control 402' to continuously monitor any change in the operating conditions of the physical system that deviate from the simulated conditions in the digital twin.

This is generally not the case in the prior art, where the digital twin usually has a built-in model and real-time data observed in the physical system are fed into the model of the digital twin but the model does not track the real-time adaptive control response and would require extensive data transmission and complex processing in order for the model to perfectly track the physical system in real-time. According to the present disclosure, it is not just the data of the circuit 104 which are observed and fed to the digital twin, but also the control data from the circuit controller 206 and, in particular, of the artificial intelligence 208. Hence, according to the present disclosure, the digital twin 200' can use the data from the controller 206 and artificial intelligence 208 of the physical system 200 to adapt the response of the circuit 204 without having to observe the data from the circuit 104 in its entirety.

The digital twin 200' can be used to determine what changes to the transfer function of the circuit 204' the supplementary control 402' should implement in order to achieve the desired performance and such changes can then be applied in the physical system 200.

The cyber-physical systems according to the present disclosure ensure first of all that the digital twin will always mirror the physical system exactly. Moreover, it means that the digital twin does not need to receive in input every single parameter of the circuit 104 in order to mirror the real world behaviour of the circuit 104.

If the digital twin 200' were to employ a fixed model of the circuit 104 and controller 206 as is common in the prior art, then every single data from the circuit 104 would need to be input into the digital twin's model to ensure that the circuit 104 of the physical system 200 and the circuit 104' of the digital twin 200' evolve in an identical way. However, according to the present disclosure, since the controller and AI data are also fed into the system, it is not necessary to read all the data of the circuit 104.

This is very beneficial since transferring all data of the circuit 104 can be a cumbersome task, whereas in comparison controller's data and the data of the AI 208 will generally be much less than the data of the circuit 104, whilst still ensuring no information is lost.

In some embodiments, it will be sufficient to transfer to the digital twin 200' only data related to perturbances in order for the physical system 200 and digital twin 200' to mirror each other perfectly.

The main circuit controller 206 (which may be referred to as closed loop controller when a feedback 210 is implemented) is able to maintain a stable operation and will continue to respond in a predictable manner even when changes are implemented in its parameters or when changes are implemented in the transfer function of the circuit 104 by the supplementary control 402. The circuit controller 206 will basically react to any correction of the supplementary control 402 as if it were measurement error or noise in the circuit 104.

Cyber-physical systems may have multiple applications. For example they may be used in smart dynamic schedulers for providing continuous process optimization, artificial intelligence-based dynamic behaviour and distributed control that can adapt to both local and global conditions in real-time.

For example, in a system with multiple supply units where each supply unit has its own efficiency and maintenance issues, different temperature-affected performance, etc, the smart schedule might be configured to decide if and which unit needs to work at a higher output vs all units working at a lower equal output. In this case using a cyber-physical would allow to: simulate all of it in advance in the digital twin using the physical system's data hence ensuring that the digital twin is an actual perfect copy of the physical counterpart; and to look at the costs and benefits of each configuration.

The supplementary control 402 outputs a correction without changing the closed loop response of the circuit controller 206. This can be used to improve the output error of the controller 206. For example, it allows to change the configuration of the controller 206 while the circuit 104 is in use. Any change in the circuit controller 206 would clearly cause a disturbance in the circuit 104. However, this can be compensated by the supplementary control 402.

With reference to the smart scheduler example discussed above, the supplementary control 402 can respond to a component which is failing in order to accommodate the extra power that needs to be delivered and this can be done in a continuous way without disrupting operation of the circuit controller 206 and circuit 104.

The circuit controller 206 may also comprise a sliding mode controller (SMC). Sliding mode control is a technique which consists in a nonlinear control method that alters the dynamics of a nonlinear system by applying a discontinuous control signal which forces the system to "slide" along a cross-section of the system's normal behaviour. When the circuit controller 206 changes its control signal from a first signal S1 to a second signal S2, the circuit 104 will transitions from a first response R1 to a second response R2. However, due to the jump in the control signal, the circuit 104 will have a transient natural response.

The supplementary control 402 can be used to modify the transfer function of the circuit 104 in order to compensate for its natural transient response, such that the overall response of the circuit 104 to the control signals of the circuit controller 206 is as close as possible to the ideal scenario.

The smart scheduler may use artificial neural networks to modify the control parameters of the controller 206 or supplementary control 402 and multiple complimentary artificial neural networks may be added and taken off as the overall system can follow learned policy iterations with similar results to sliding mode control.

In some embodiments the supplementary control 402 will be implemented in parallel with the circuit controller 206 and the overall effect on the circuit 104 will be the summation of the supplementary control 402's output and the circuit controller 206's output, however the circuit controller 206 will not be aware of the supplementary control 402.

In some embodiments where the circuit 104 is provided with a target reference state or value for the functionality 203, the supplementary control 402 is configured to take into account the output error, that is the difference between the current state or value of the functionality 203 and the target state or value, and it will implement complementary output correction in order to reduce the output error taking into account the predicted response of the main controller 206 to the changes of the output error and the predicted changes in the operating conditions (predicted load changes, recognized load patterns that results in overshoot/undershoot, etc).

The present disclosure applies to a wide range of circuits, but an example application is in the field of power supplies. A power supply circuit is designed to deliver a controller power output for a load, usually by controlling an output voltage or current, such as by regulating the output to have a substantially steady voltage or current value.

Power supply circuits can also step up or step down an input voltage to a different output voltage. Some power supply circuits are switching regulators which are supplied with controllers that apply sophisticated pulse width modulation (PWM) control and operational algorithms which selectively operate switches to control the charge and discharge of a storage element such as an inductor to control the transfer of charge across the circuit. Various topologies are well known and will not be discussed here in detail.

One key application area of power supply circuits is in the Internet of Things (IoT) which has seen rapid development in recent years. However, successful deployment and wide acceptance of Internet-of-Things (IoT) technology depends on the ability of these modules to function in different environments with widely varying energy sources. In some cases, this requires compatibility with the existing power supply sources up to 24V while the advanced semiconductor processes used in manufacturing of IoT devices typically require less than 1V.

Ideally, the same IoT module should be able to operate efficiently with available supplies, batteries or other power sources including energy harvesting. In addition to the flexibility of the input supply voltage range, the ability to handle current load transitions with challenging package parasitic inductance requires dynamic and intelligent supply regulation in order to operate efficiently under real life use cases. This is best handled within the module for robust and flexible supply regulation.

When the disclosure relates to a power supply, the circuit 204 of FIG. 2 may be a power supply circuit and the functionality 203 may be a regulated output voltage or current.

A power supply system may be provided with on-chip control unit 202 with integrated artificial intelligence 208 that may have a machine learning capability. Inputs to the control unit 202 include voltage and current monitors as well as various states of the device that contain relevant information regarding the power consumption and load transients.

The input to the artificial intelligence may include information regarding the run state of the load block, clock speed and other relevant information such as information from a memory buffer stack that will allow a neural network provided as part of the artificial intelligence component to determine the anticipated power consumption as well as the load transients.

The artificial intelligence component may be a configurable and scalable neural network that utilizes machine learning based on simulations of anticipated operations, including unexpected supply changes and all possible load current transitions. A deep learning architecture with purpose driven hidden layers handling state transitions as well as control of switches for regulation while in a given state of the system may be provided. The simulation data is used to train the neural network.

The system may further comprise a signal processing unit which provides a predictor and corrector functionality (for example employing a Kalman Filter or equivalent), which is used to train the neural network.

A predictor/corrector digital signal processing unit and an artificial intelligence unit with state estimation as its output could use Extended Kalman Filter coefficients and a state machine to determine the most likely state of the system.

The controller may comprise a neural network that is trained during start-up operation and for a set period after the stable regulation is achieved. No previous training is required. This means that training can be performed under real use cases with actual components and the actual process dependent device parameters.

In preferred embodiments, the training of the neural network can be focused on deviation of the operating conditions such as load transients and other external events in the supply or other unexpected events, and the control of the circuit can be mainly achieved by the predictor/corrector block.

A reference signal used as an input to the artificial intelligence component may be a relative signal, without requiring an absolute value. The reference signals may preferably mainly provide time delayed relative change, and the few absolute references can be less than 20% accurate with ultra-low power consumption.

An accuracy requirement of the system for the references and monitoring functions may be determined by simulation with neural network inference functionality for a wide range of errors introduced, without impacting the controllability of the system.

The inputs to the neural network have a pre-defined error zone where the combination of the inputs are outside the acceptable range of values for the intelligent control and the system protects itself by setting all the switches in a universally safe mode and generates interrupt. This safe mode includes shut down and other fault conditions such as over current protection, under-voltage protection, etc.

The neural network may be trained to respond to both expected and unexpected events such as external supply deviations or malicious attacks providing a robust solution.

The neural network may further identify malicious code running on the digital block that is intended to create power instability.

The internal operation of the neural network is protected from malicious attacks and from reverse engineering of the digital block functionality by external agents that are observing current waveforms. This can be achieved by randomly generating current load events that disguise the actual operation of the digital block. The current load events may be simulated by use of the supplementary control elements to introduce perturbations, or by selective operation of the regular controls of the circuit in a non-standard manner.

Figure 5:
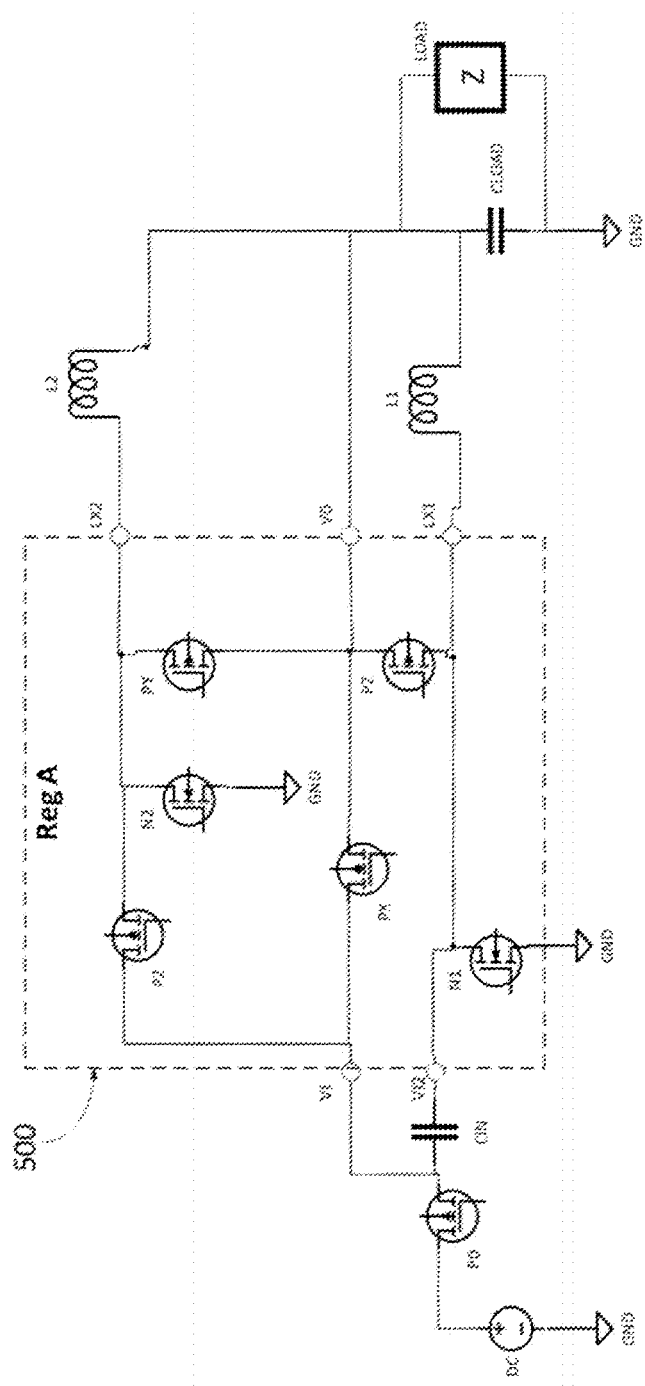
FIG. 5 illustrates a flexible switching regulator with efficient divide by four regulation using input capacitor.

A specific embodiment will be described, as an example of how the principles of the disclosure may be applied. According to this embodiment, the circuit 204 may comprise a switching regulator circuit 500, as shown in FIG. 5, shown coupled with an input capacitor CIN and optional external switch element P0 may be provided to enable selective charge of an input capacitor CIN.

The circuit 500 receives input voltages VI1 and VI2 and provides an output voltage V0 and switching outputs LX1 and LX2 that are connected to inductors L1 and L2 (not shown). The inductors are driven with switching pulses having corresponding duty cycle as to generate output voltage V0 which can be coupled with energy storage elements (not shown). Operation of the circuit 500 is controlled by a set of regulation transistors N1, N2, P2 and a set of supplementary control elements in the form of transistors PX, PY, PZ. Circuit 500 is connected to the external input voltage supply with a switch P0 that can also be an external switch. PX, PY, PZ switches are used during the start-up operation for initial ramp and calibration procedure. PX switch can also be used as a shunt regulator for providing additional current to the output. PY, PZ switches are used during STANDBY mode of the corresponding phases and their utility is described below in start-up operation, calibration operation, single phase operation, and during inactivity of phases in discontinuous current mode of operation.

The input capacitor CIN may be nominally charged to Vin/2, providing efficient divide by 2 for a subsequent two-phase buck operation. This is very useful for efficient step-down regulation when input voltage is more than or equal to four times the required output voltage.

Switches P2 and N2 can be used as a single-phase buck without divide by 2 in cases where there is a smaller ratio of input to output voltage (VI<4*V0), for example for low voltage events such as a drained battery. In single phase operation L1 phase is in STANDBY (N1 is OFF, PZ is ON), P0 can be left always ON and the voltage across Cin is constant as VI−V0 (VI2=V0 since PZ in always ON).

Switch PX can be used for extreme load transient events when the output voltage drops below a critical voltage. This is typically a short pulse providing required amount of charge to the load capacitor to eliminate voltage droop.

Figure 6:
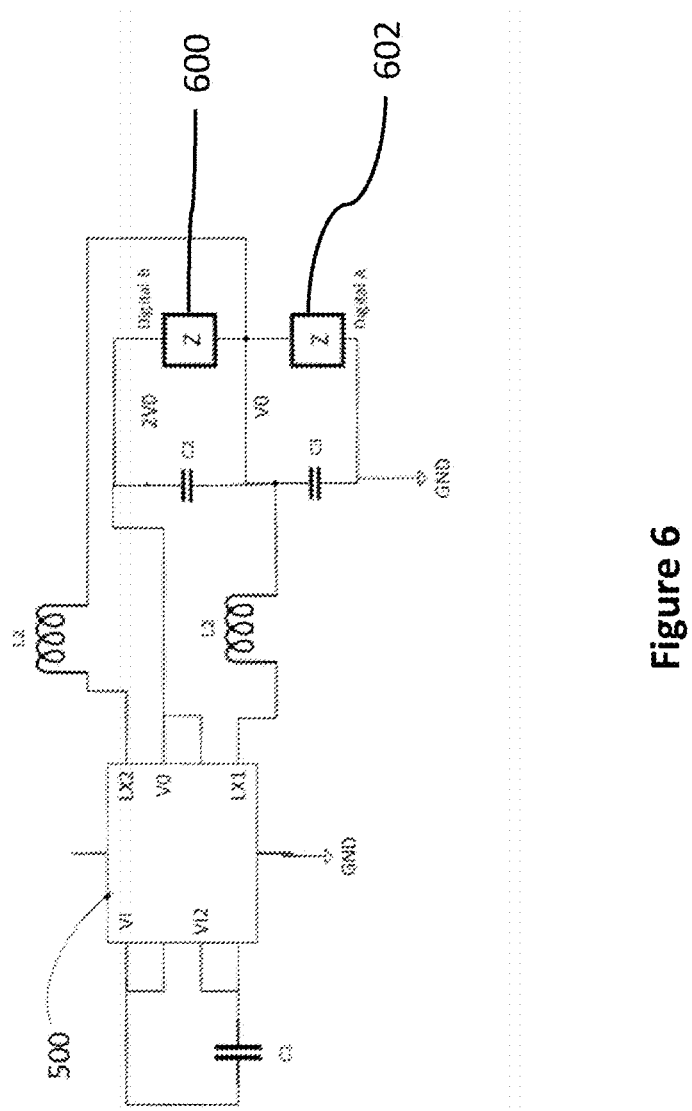
FIG. 6 illustrates Vout and 2×Vout output voltages and stacked digital blocks.

A special use case example is given in FIG. 6 using the double output time sequence described above to allow stacked digital blocks where a first digital block 600 is supplied by V0 and a second digital block 602 has an isolated ground reference biased at V0 and the supply reference biased at 2*V0, effectively the same V0 voltage between supply and ground. 2*V0 supply can also be connected to the I/O blocks which is typically higher voltage compared to the core digital blocks.

Figure 7:
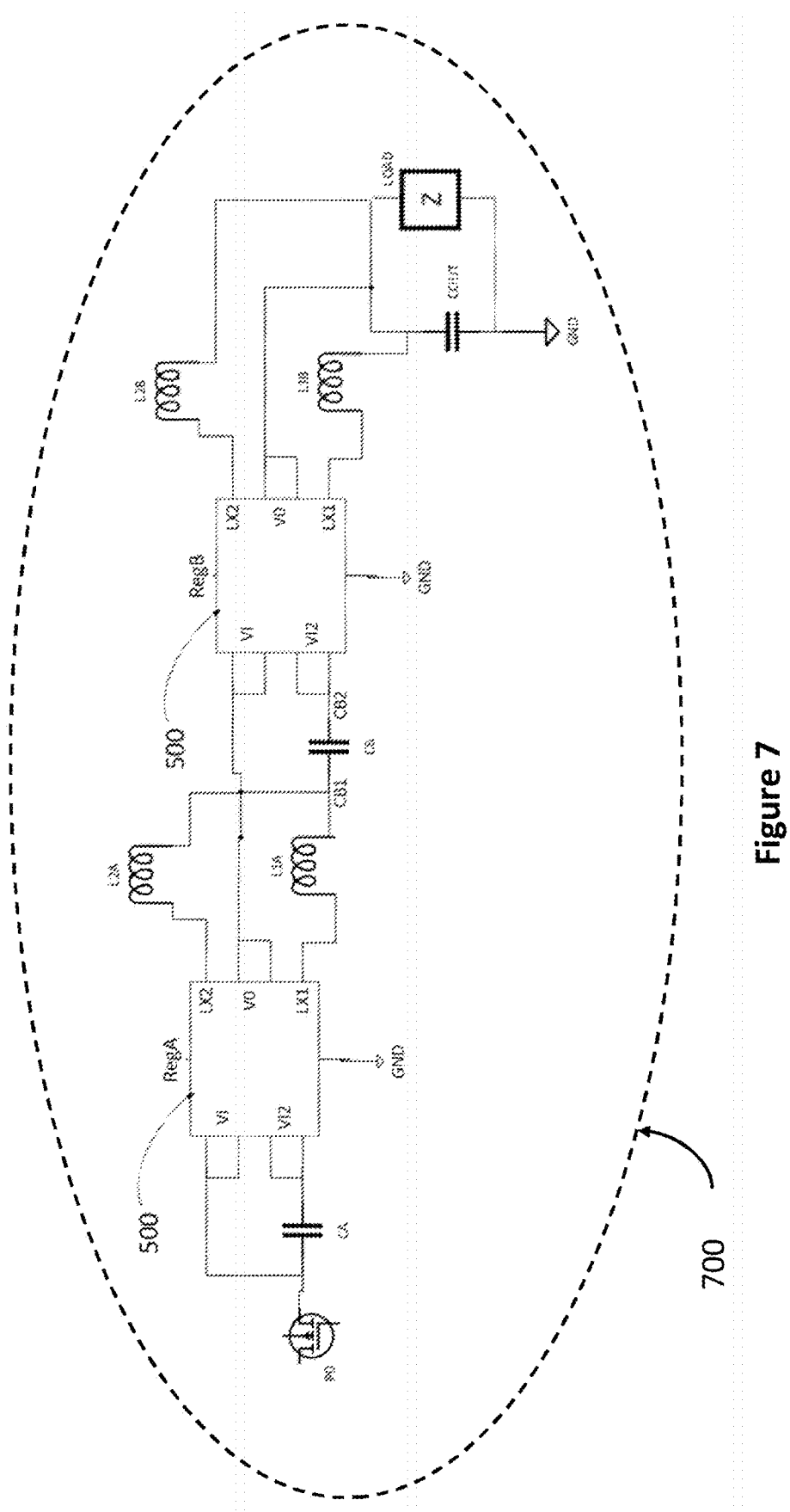
FIG. 7 illustrates two cascaded regulators.

In one embodiment of this disclosure, two cascaded two-phase switching regulators control circuit 700 is provided, according to FIG. 7. It will be appreciated that an analog/digital control circuit could be utilized, or that a system with a single phase or a greater number of phases may be provided.

In FIG. 7, two switching regulator circuits 500 are provided as first stage two-phase regulator circuit RegA with input capacitor CA and second stage two-phase regulator circuit RegB with input capacitor CB. A first output voltage of the first regulator circuit RegA provides input for second regulator RegB; and each regulator RegA, RegB is provided with respective energy storage elements in the form of inductor pairs L1A, L2A and L1B, L2B. A load is provided with energy via an output capacitor COUT, and an external switch element P0 may also be provided. The output of the first stage RegA is CB1 switches between VCB (voltage across the capacitor CB) and 2*VCB as switch N1 of second stage RegB turns ON and OFF. Depending on the duty cycle of RegB the target output regulation voltage of RegA also changes as (RegBDutyCycle*2*VCB+(1−RegBDutyCycle)*VCB) while the actual CB1 voltage switches between 2*VCB and VCB. This is accommodated by the chosen control circuit implementation.

The regulator circuit 700 of FIG. 7 may be controlled by a circuit controller comprising a switching regulator control circuit capable of running continuous current mode (CCM) and/or discontinuous current mode (DCM) operation and a parallel artificial intelligence component with machine learning capability.

A simulation was carried out based on a digital control circuit using 5-bit DPWM (Digital Pulse Width Modulation) providing time sequence with 32 time slots. A digital control circuit runs through these 32 time slots repeatedly and adjusts the duty cycle of the power supply based on the output voltage error.

For each one of the 32 time slots each inductor will be in one of three modes, as below:

| SW Mode Description | L1 Switches | L2 Switches | Mode Label |
|---|---|---|---|
| Hi | P0 [OPTIONAL] | P2 | 1 |
| Forced Standby | PZ | PY | 0 |
| Lo | N1 | N2 | N |

Using this simplified notation, a CCM time sequence may be generated by the sequence shown in FIG. 24.

Similarly, a DCM time sequence may be generated by the sequence shown in FIG. 25.

The PX switch may be implemented as a digitally controlled ON resistance as provided below:

| Bit | R_ON (Linear Code) | Thermometer Code with R_ON | Alternative R_ON | Thermometer code with Alt. R_ON |
|---|---|---|---|---|
| 0 | OFF | OFF | OFF | OFF |
| 1 | 25.6 Ohms | 25.6 Ohms | 12.8 Ohms | 12.8 Ohms |
| 2 | 12.8 Ohms | 8.33 Ohms | 12.8 Ohms | 6.4 Ohms |
| 3 | 6.4 Ohms | 3.66 Ohms | 12.8 Ohms | 4.27 Ohms |
| 4 | 3.2 Ohms | 1.71 Ohms | 12.8 Ohms | 3.2 Ohms |
| 5 | 1.6 Ohms | 0.83 Ohms | 3.2 Ohms | 1.6 Ohms |
| 6 | 0.8 Ohms | 0.41 Ohms | 1.6 Ohms | 0.8 Ohms |
| 7 | 0.4 Ohms | 0.2 Ohms | 0.8 Ohms | 0.4 Ohms |

Two different coding examples are given in the table. Linear code is more flexible allowing linear current values to be programmed in steps of (VI−V0)/(25.6 Ohms); while the thermometer code is more robust and tolerant to process variations. As an example 0.4 ohms can be obtained by turning all the PX gates, setting thermometer code 11111110 with alternative R_ON values, while the linear code 10000000 setting for 0.4 Ohms relies on only one PX gate to handle all the current and be precisely manufactured.

The digital controller adjusts the duty cycle in order to achieve output voltage regulation target. The time sequence can also include use of switch PX in a predetermined manner under specific circumstances such as start-up or when there is a very large under-voltage condition.

The artificial intelligence component may be provided with a machine learning algorithm which can change the duty cycle of the circuit controller, overriding the control loop, or which can turn on the supplementary control element (here, PX) with a code.

The CCM and DCM time sequence examples above are generated by digital bit codes as provided in the tables below.

| Mode Code (4-bit) | Type | SubType | Modes for ML and predetermined time seq |
|---|---|---|---|
| 0000 | STBY | | Standby Mode (PX OFF, PY/PZ ON) |
| 0001 | DCM | Constant ON time | Default DCM code with DC based on Vin, Vout using a preset small Constant ON time |
| 0010 | DCM | MAX COT | Default DCM code with DC based on Vin, Vout using maximum Constant ON time determined by the maximum inductor peak current |
| ... | | | Other DCM Modes |
| 0100 | DCM | | CCM to DCM transition immediately by setting both phases in STANDBY for the remaining period of the current sequence |
| 0101 | DCM | | DCM to CCM [1001] transition starting at Ph2 HS ON (Single phase CCM) |
| 0110 | DCM | | DCM to CCM [1000] transition starting at Ph2 HS ON |
| 0111 | DCM | | DCM to CCM transition immediately, breaking out of current DCM sequence and turning on PX for maximum safe current thru PX |
| 1000 | CCM | | Default CCM code based on Vin, Vout |
| 1001 | CCM | 1-ph | Single Phase CCM code based on Vin, Vout |
| ... | | | Other CCM Modes |
| 1100 | INT | Under Voltage | If 2-phase operation, VI < 4 * V0 If 1-phase operation, VI < 1.2 * V0 |
| 1101 | INT | Over Current | Over current protection circuit triggered during CCM operation. Safe preset sequence |
| 1110 | INT | | Various interrupt modes handling exceptions |
| 1111 | PASS | | Pass thru Mode (PX, PY, PZ ON) |

Duty cycle is specified with a 6-bit code for each phase as described in the table below

| (6-bit) Duty Cycle | Lower Limit | Upper Limit | COMMENTS |
|---|---|---|---|
| 0000xx | 0.0% | 0.0% | 4 MSB bits determine the HS time period (t0-t15 for Ph1, t16-t31 for Ph2) |
| 000100 | 3.125% | 3.90625% | |
| 000101 | 3.90625% | 4.6875% | |
| 000110 | 4.6875% | 5.46875% | 2 LSB bits are handled by dead time control circuit that also handles the HS/LS transitions |
| 000111 | 5.46875% | 6.25% | |
| 001000 | 6.25% | 7.03125% | |
| ... | | | 2 LSB ignored for [0000] and set to 00 |
| 111110 | 48.4375% | 49.21875% | |
| 111111 | 49.21875% | 50% | |

Dead Time control circuit can be implemented as a fixed time delay or in combination with a gate sense circuit and the implementation is known to people familiar with the art. It ensures that the transition between high side switch and low side switch is done safely where there is no shoot thru current from supply to ground during these transitions and efficiency considerations are taken into account. In the current disclosure 2LSB of 6-bit Duty Cycle code is handled by Dead Time Control circuit in addition to the typical dead time control considerations by adding a delay during the HS to LS transition prior to Dead Time as shown in the timing diagram in FIG. 21. Dead Time Control handles the transition to LS to HS without delay regardless of the value of 2 LSB. This provides a finer control of the duty cycle where the 4 MSB handled digitally as a DPWM and 2LSB handled by the Dead Time Control which is implemented as a mixed signal circuit. As shown in the table above The 2 LSB ignored for [0000] in order to avoid HS pulses that are too short to be implemented in a meaningful manner and they are inefficient.

PX control is very flexible and 8-bit gate control code can be inserted anywhere within the 32 time sequence with duration specified for up to full period in 5-bit. When the code is not specified the sequencer applies R_ON CODE 0 (i.e. PX is OFF).

| Start (5-bit) | R_ON CODE (8-bit) | Duration (5-bit) |
|---|---|---|
| Time slot | Code for PX if not "0" | Duration for Code |

Therefore, it can be seen how a digital control can set the type of mode of operation (CCM or DCM), the duty cycle for each phase, and a control value for a supplementary control element, PX. With the teaching of this example, it can be appreciated that similar control mechanisms can be implemented for other types of circuits.

An example of input and output parameters are given for the digital controller and machine learning (ML) training in the table below. The 16-bit Mode/DutyCycle (DMDC) code and 18-bit PX code (DPX) determine the operation for the next 32 time slots. The digital controller operates on fixed 32 time sequence (t0 thru t31) with each phase2 always starting at time slot t16. An ML unit can operate out of sequence or modify the next 32 time sequence code.

| Input parameters | Digital controller | ML Unit |
|---|---|---|
| Vin(measured) | 16 bit Mode/Duty Cycle | 16 bit Mode/Duty Cycle |
| Vout (measured) | 18 bit PX Control | 18 bit PX Control |
| Vout (target) | | |
| L1 current (measured) | | |
| L2 current (measured) | | |
| CA/CB voltage (measured) | | |
| IL1/IL2 zero-cross detect | | |
| Max current detect | | |
| Load information | | |
| Etc. | | |

L1 current can be measured by the current through N1, PZ depending on the mode. L2 current can be measured by the current thru P2, N2, or PY depending on the mode. PX current can be measured or determined by the PX code and Vin/Vout measurement since it is already trimmed. Load information comes from the digital block and can be determined based on the software instructions in the pipeline.

Figure 9:
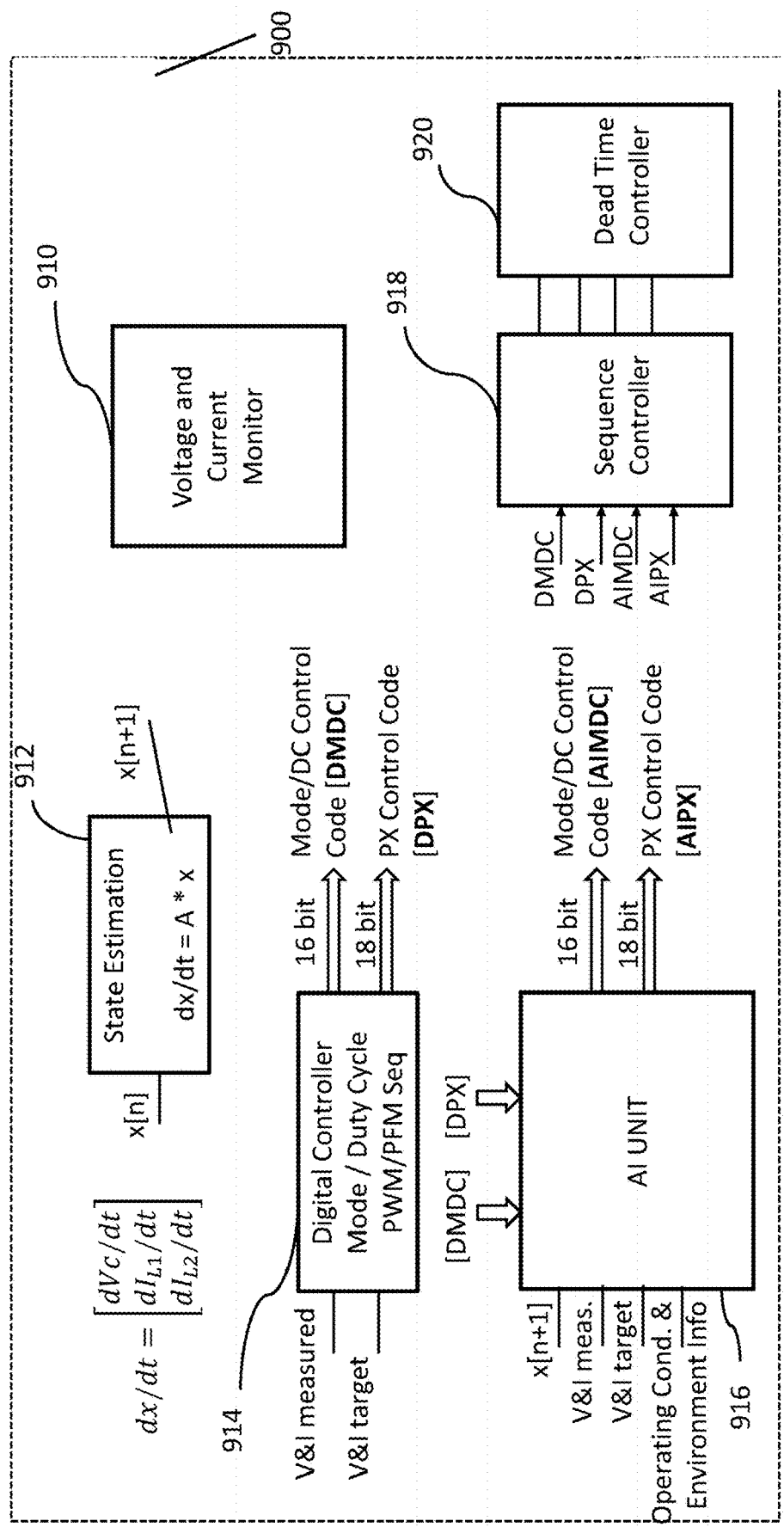
FIG. 9 illustrates a cascaded structure where Vin=24V, Vout=0.5V-1.0V, Reg_A switching frequency 6.25 MHz, Reg_B switching frequency is 50 MHz.

FIG. 9 shows an example circuit control 900 according to an embodiment of the disclosure. Here, a monitoring unit 910 is coupled with an output voltage of the circuit in order to feed back system state information to the circuit control 900. The monitoring unit 910 may measure one or more electrical parameters of the system, and may provide one or both of voltage and current measurements. The electrical parameter measurements may comprise the rate of change of the parameters.

The output electrical parameters from the monitoring unit 910 are provided to a state predictor 912, a digital sequence controller 914 and an artificial intelligence engine 916.

The state predictor 912 receives the electrical parameters from the monitor 910 and operates on these to output state vectors X[n+1] which may comprise circuit component operating values such as capacitor voltages and inductor currents and which represents the estimated state of the system.

A digital sequence controller 914 may apply control algorithms such as pulse width modulation (PWM also referred to as CCM in the text above) or pulse frequency modulation (PFM also referred to as DCM in the text above), and can receive inputs including the electrical parameters from the monitor 910 and target electrical parameters such as one or more reference voltages or currents. It provides as outputs digital control codes comprising a first control code DMDC including mode and duty cycle commands; and a second control code DPX including control commands for the supplementary control element (PX in this example). The digital sequence controller 914 determines the mode of operation (PFM or PWM) and the optimum duty cycle based on the input and output voltages and target for regulated voltage.

An artificial intelligence engine 916 receives various inputs including the control codes DMDC, DPX from the digital sequence controller 914, state vectors from the state predictor 912, the output electrical parameters from the monitoring unit 910, the target electrical parameters, and other operational and environmental information. It provides as outputs digital control codes comprising a first control code AIMDC including mode and duty cycle commands; and a second control code AIPX including control commands for the supplementary control element (PX in this example).

The artificial Intelligence engine 916 may be provided with a machine learning component that may be trained for responding to the deficiencies of the state predictor 912 and digital sequence controller 914. The artificial Intelligence engine 916 may also detect other significant events such as load transitions, supply anomalies, component failures, and malicious software/hardware attacks.

Figure 21:
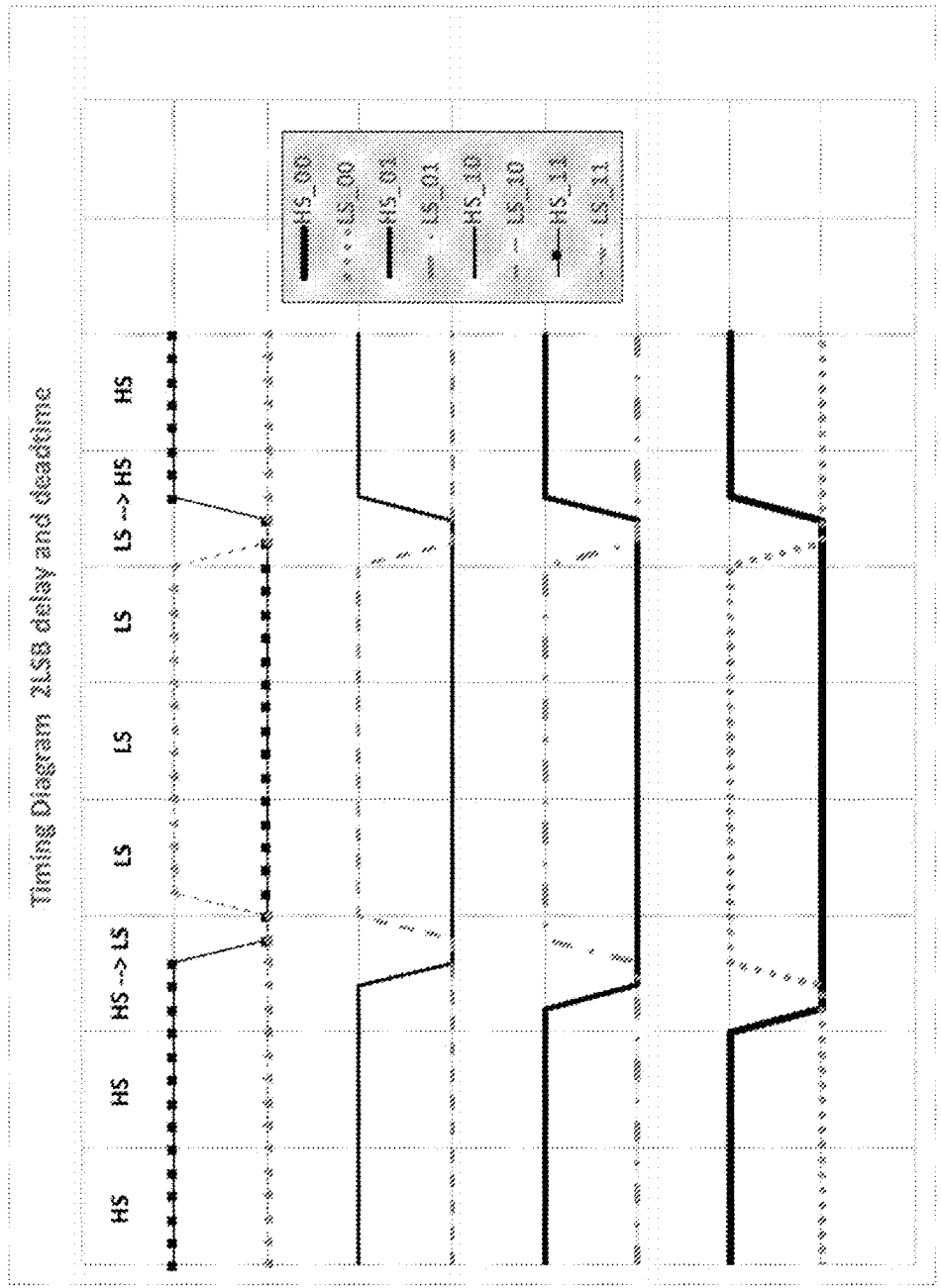
FIG. 21 illustrates a timing diagram showing 2LSB delay and deadtime.

The sequence application circuit 918 then receives the digital control codes DMDC, DPX, AIMDC, AIPX from both the digital sequence controller 914 and the artificial intelligence engine 916 and provides output commands to a dead time controller 920 which handles the transition and provides finer duty cycle resolution as shown in the timing diagram in FIG. 21.

Figure 10:
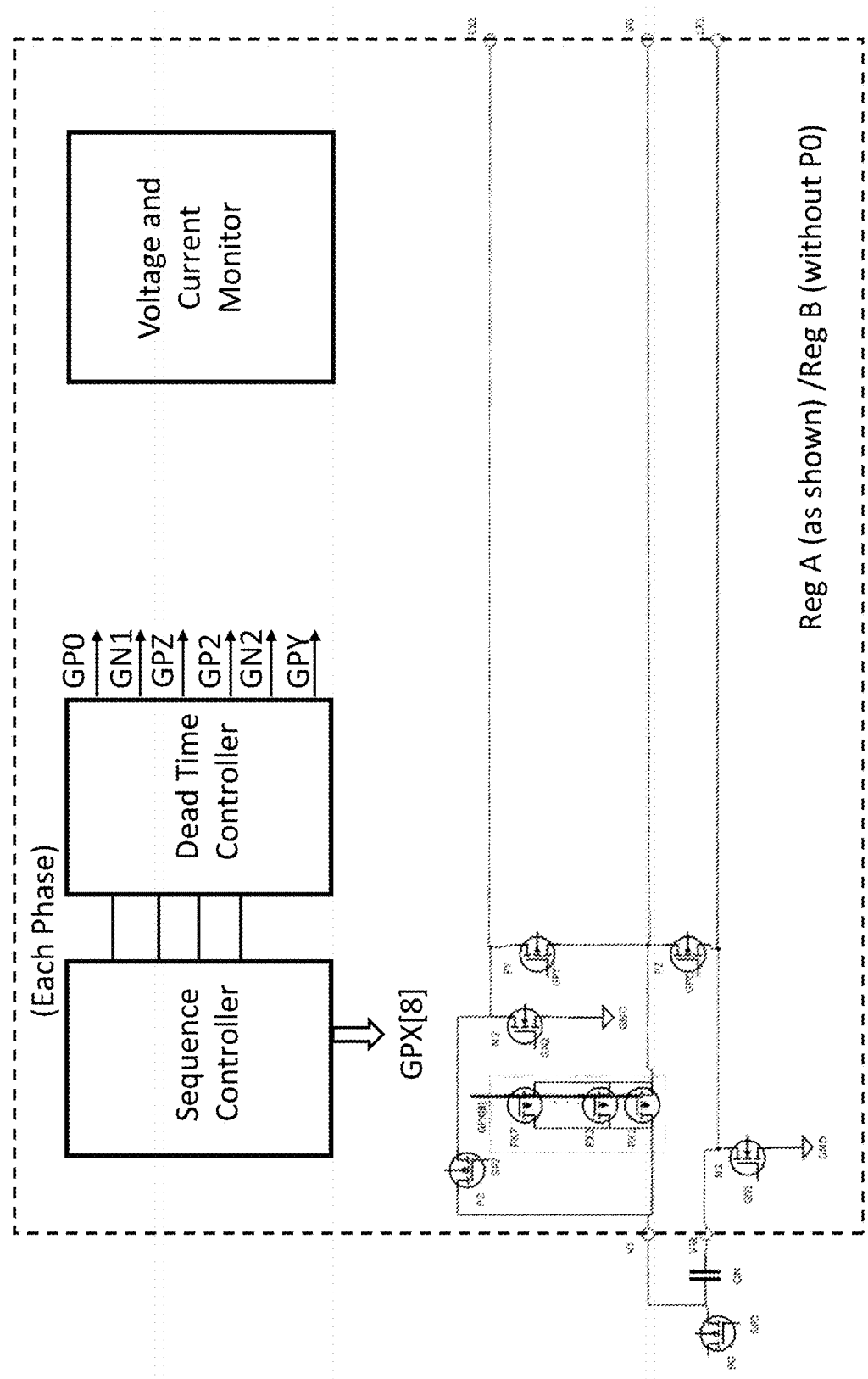
FIG. 10 illustrates a sequencer control and deadtime controller for handling the HS/LS transitions and finer resolution of duty cycle. Switch PX is also shown as including multiple parallel gates forming a digitally controlled pass transistor.

FIG. 10 shows an example of how a circuit control 900 can be used with a regulator circuit similar to that shown in FIG. 5. Here, the supplementary control PX is provided as a switch array rather than as a single switch. The circuit of FIG. 10 provides a sequencer control and deadtime controller for handling high side/low side transitions and which provides finer resolution of duty cycle.

For illustration purposes, in one embodiment of this disclosure and with reference to FIG. 7, the load circuit may be manufactured with advanced semiconductor process that can handle maximum 1V and the voltage has to be less than 1V at all times including start-up. L1_B and L2_B are chosen to be small inductors that can be integrated in the same package as the load circuit, nominally 10 nH (<60 nH) and Reg_B is running at correspondingly high switching frequency of nominally 50 MHz (>10 MHz) to accommodate small inductors.

In order to support 50 MHz switching, N1, P2, and N2 of RegB are designed with advanced process appropriate for efficiency at high switching frequency operations. Based on these constraints N1, P2, and N2 are designed with 1.8V CMOS transistors or use two cascaded 1V CMOS transistors. In both cases the voltage across NMOS transistors need to remain less than 2V. Voltage across the PMOS transistors needs to remain less than 2V when it is ON. When the PMOS is OFF the body of the transistor need to biased high (2V) to handle voltages up to 4V. These voltage maximums need to be observed at all times including start-up.

Figure 8:
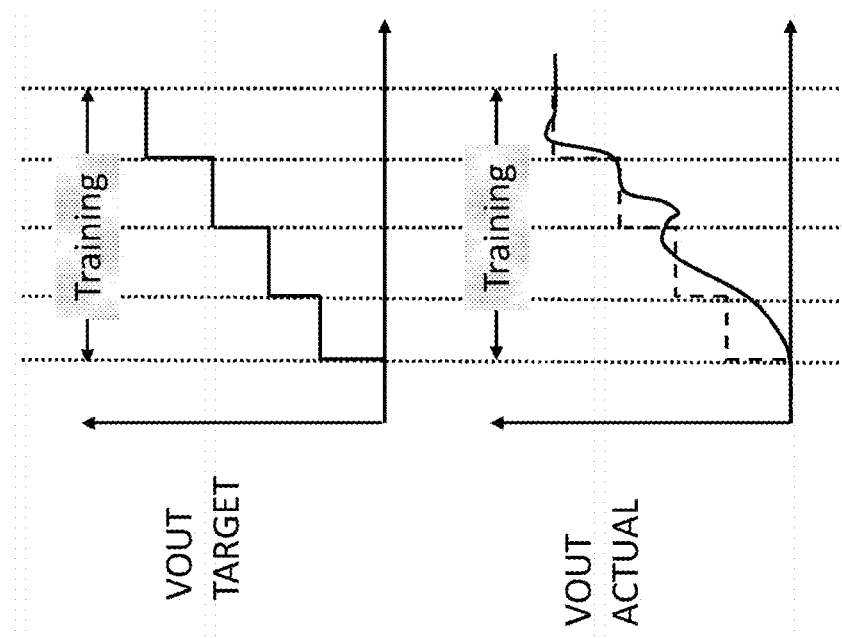
FIG. 8 illustrates a start-up period used for training neural network and machine learning in consecutive output voltage target steps from 0V to Vtarget.

Further, the gate of the switch PX may be controlled to provide linear regulation for Vout (operating as an low dropout (LDO) regulator) during certain modes of operation such as deep sleep mode to maintain the voltage across the capacitors or during start-up in order to charge the capacitors to a specified voltage The digital control unit containing a predictor/corrector blocks use the inductor currents and capacitor voltages as state variables and optimize the coefficients during the start-up period. The start-up period consists of consecutive target voltage steps starting from 0V and continues until final target regulation voltage as shown in FIG. 8.

Further features may be provided:
i) Voltage measurement across the capacitors CA, CB and Cout are used as the input to integrators and differentiators with different preset time constants, and comparators with different reference voltage levels. The outputs of these integrators, differentiators, and comparators are used as input for the neural network of the controller unit described above for machine learning.
ii) The machine learning architecture described in (i) where the output of the neural network is one of many predetermined time sequences.
iii) The machine learning architecture described in (i) where the output of the neural network is used to determine the duty cycle of the switching regulators
iv) The controlled unit described in (i) where additional inputs to the neural network include information regarding the run state of the load block, clock speed and other relevant information such as memory buffer stack that will allow a neural network to determine the anticipated power consumption as well as the load transients In one embodiment of this invention;
i) The switch PX is constructed as multiple parallel switches and input to these parallel switches is a thermometer code determining the number of switches that are turned on.
ii) The switch PX is constructed as multiple parallel switches where the gate length of the switches double starting from the switch connected to the MSB. Hence the digital input code produce proportional current.
iii) Digitally controlled switch bank as described in (ii) where the current value is determined by monitoring the input and output voltages of the switch bank
iv) Digitally controlled switch bank used as PX in Reg_A block of FIG. 2 where the input code is adjusted to provide a constant current based on the state of the N1 switch of Reg_B block
v) Digitally controlled switch bank used as PX in Reg_A block of FIG. 2 where the input code is adjusted to provide a constant current based on the state of the PX switch of Reg_B block
vi) The PX switch is used as a low drop out regulator with analog or digital control loop We now turn to provide further explanation about the specific embodiment shown in FIG. 5.

The circuit containing switches N1, P2, N2, PZ, PY, PX is novel and different from prior art.

In this embodiment, the circuit 500 provides output to inductors L1 and L2. The output can be a load or another regulator as shown in FIG. 7 below. With components C, L1, and L2; the circuit is designed to provide a very efficient divide by four switching regulator output and a pass thru functionality as well as linear regulation. It allows an instantaneously stable system of operation when required (or determined by intelligent control unit) at the expense of efficiency. It allows very wide range of input voltage to output voltage ratio and can be cascaded to increase the range further without significant impact on efficiency.

The first regulator of a cascaded chain would also have the switch P0. Note that the consecutive regulators do not require this switch as the node can be set as high impedance nodes without this switch.

There are many variations of operation, but the circuit design is chosen to allow the following fundamental modes of operation. The outputs LX1 and LX2 are considered separately.

For LX1 output when LX2 is in standby mode with P2 and N2 is OFF, and PY is ON;

| Mode | V_Cin | P0 | N1 | PZ | PX | Vout | Description |
|---|---|---|---|---|---|---|---|
| A | Vin/2 | ON | OFF | OFF | OFF | 0 → Vin/2 | Increase L1 current |
| B | Vin/2 | OFF | ON | OFF | OFF | 0 → Vin/2 | Decrease L1 current |
| C | X | X | OFF | ON | X | X | STBY Mode/1$^{st}$ order stable |
| D | Vin | ON | OFF | ON | LIN | 0 → Vin | LDO mode with PX regulating the output in linear mode |
| E | Vin | ON | OFF | ON | ON | Vin | Pass thru |
| F | Vin | SW | SW | OFF | SHORT PULSE | Vin | While A/B alternating and positive inductor current, additional current boost can be provide by PX |

For LX2 mode with P0 ON all the time when LX1 is in STBY mode with N1 is OFF, and PZ is ON;

| Mode | V_Cin | P2 | N2 | PY | PX | Vout | Description |
|---|---|---|---|---|---|---|---|
| A2 | Vin-Vo | ON | OFF | OFF | OFF | 0 → Vin | Increase L2 current |
| B2 | Vin-Vo | OFF | ON | OFF | OFF | 0 → Vin | Decrease L2 current |
| C2 | Vin-Vo | OFF | OFF | ON | X | X | STBY Mode/1$^{st}$ order stable |
| D2 | Vin-Vo | OFF | OFF | ON | LIN | 0 → Vin | LDO mode with PX regulating the output in linear mode |
| E2 | Vin | OFF | OFF | ON | ON | Vin | Pass thru |
| F2 | Vin | SW | SW | OFF | SHORT PULSE | Vin | While A/B alternating and positive inductor current, additional current boost can be provide by PX |

In most efficient mode PX, PY, PZ remain OFF and both phases running as a switching regulator in continuous current mode as below;

| Mode | V_Cin | P0 | N1 | P2 | N2 | Vout | Description |
|---|---|---|---|---|---|---|---|
| A & B2 | Vin/2 | ON | OFF | OFF | ON | 0 → Vin/2 | L1 high side duty cycle |
| B & B2 | Vin/2 | OFF | ON | OFF | ON | 0 → Vin/2 | |
| B & A2 | Vin/2 | OFF | ON | ON | OFF | 0 → Vin/2 | L2 high side duty cycle |
| B & B2 | Vin/2 | OFF | ON | OFF | ON | 0 → Vin/2 | |

When load current is light and discontinuous current mode of operation similar to pulse frequency modulation (PFM) is expected then the Standby state would also be observed as below;

| Mode | V_Cin | P0 | N1 | P2 | N2 | PZ | PY | Vout | Description |
|---|---|---|---|---|---|---|---|---|---|
| C/C2 | Vin/2 | OFF | OFF | OFF | OFF | ON | ON | 0 → Vin/2 | STANDBY |
| A/C2 | Vin/2 | ON | OFF | OFF | OFF | OFF | ON | 0 → Vin/2 | L1 Hi, L2 STANDBY |
| B/C2 | Vin/2 | OFF | ON | OFF | OFF | OFF | ON | 0 → Vin/2 | L1 Lo, L2 STANDBY |
| B/A2 | Vin/2 | OFF | ON | ON | OFF | OFF | OFF | 0 → Vin/2 | L1 Lo, L2 Hi |
| B/B2 | Vin/2 | OFF | ON | OFF | ON | OFF | OFF | 0 → Vin/2 | L1 Lo, L2 Lo |
| C/B2 | Vin/2 | OFF | OFF | OFF | ON | ON | OFF | 0 → Vin/2 | L1 STANDBY, L2 Lo |
| C/B2 | Vin/2 | OFF | OFF | OFF | ON | ON | OFF | 0 → Vin/2 | L1 STANDBY, L2 Lo |
| C/C2 | Vin/2 | OFF | OFF | OFF | OFF | ON | ON | 0 → Vin/2 | STANDBY |

A simplified classification can be made for the inductors as below;

| Inductor Mode | | LI Switches | L2 Switches |
|---|---|---|---|
| 1 | Hi | P0 [OPTIONAL] | P2 |
| 0 | Forced Standby | PZ | PY |
| -1 | Lo | N1 | N2 |

The neural network determines the mode of operation as well as the optimum duration of each mode starting from the anticipated values based on simulation. This optimization depends on the tolerance of each component as well as the operating conditions that vary over time and the controller uses the start-up period to re-train the weights of each neuron and path gain of the neuron connections to adopt. The controller also has its own output to recognize the patterns and continuously improve the efficiency of the system.

The efficiency is used by the controller as a continuous measure for improvement but there are also other factors such as the information provided by the digital load. For example, the most efficient way to charge the capacitors to the final value during start-up is by switching regulator action via inductor currents but the request to start immediately might require use of PX to meet the demand in time.

Figure 11:
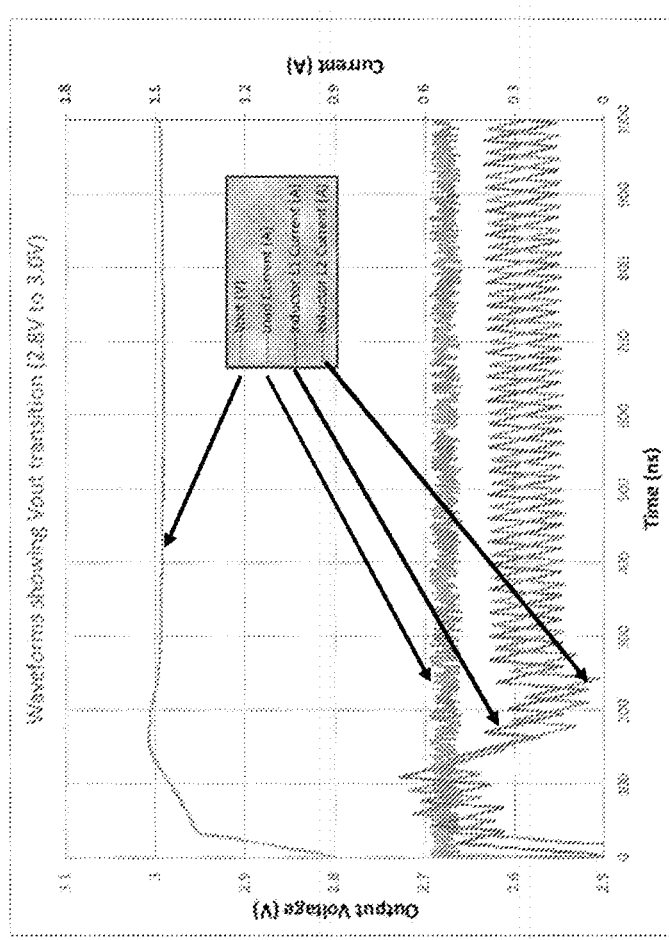
FIG. 11 illustrates waveforms showing voltage transition and fast transition utilizing a PX switch.

A typical waveform is shown in FIG. 11 for the last part of start-up where output voltage target changes from 2.8V to 3.0V. During the first 33 ns PX switch is used to allow fast charging of the output capacitor. During the entire period only four significant events observed and adjustments made as described below. For the rest of the time period for 1 us shown, the control is similar to a switching regulating control combining voltage monitor and current monitor with zero cross detection circuit. Except for these significant events Neural Network is following pre-determined modes as configured and determines no significance.

In FIG. 11 below, the duty cycle is abruptly reduced at time=114 ns; and at 121 ns through 133 ns, and abruptly increased at time 230 ns through 240 ns.

Figure 12:
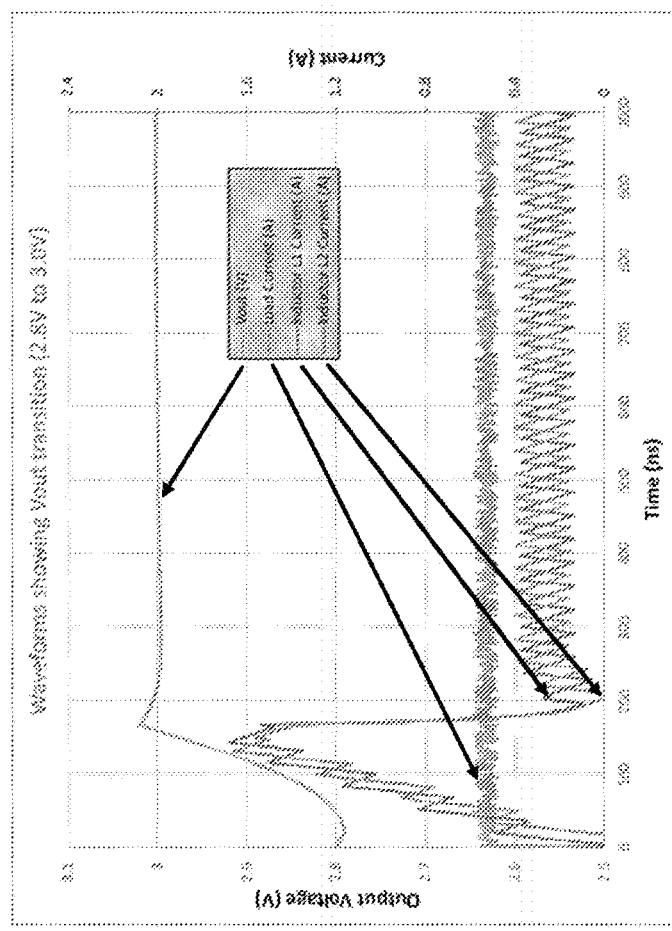
FIG. 12 illustrates waveforms showing voltage transition (no PX switch, PY/PZ used)

FIG. 12 shows waveforms showing voltage transition (no PX switch, PY/PZ used). Here, it is observed that the duty cycle is abruptly reduced at time 143 ns, and also at time 161 ns thru 186 ns during which PY/PZ switches are used; and the duty cycle is abruptly increased at time 203 ns thru 237 ns.

Figure 13:
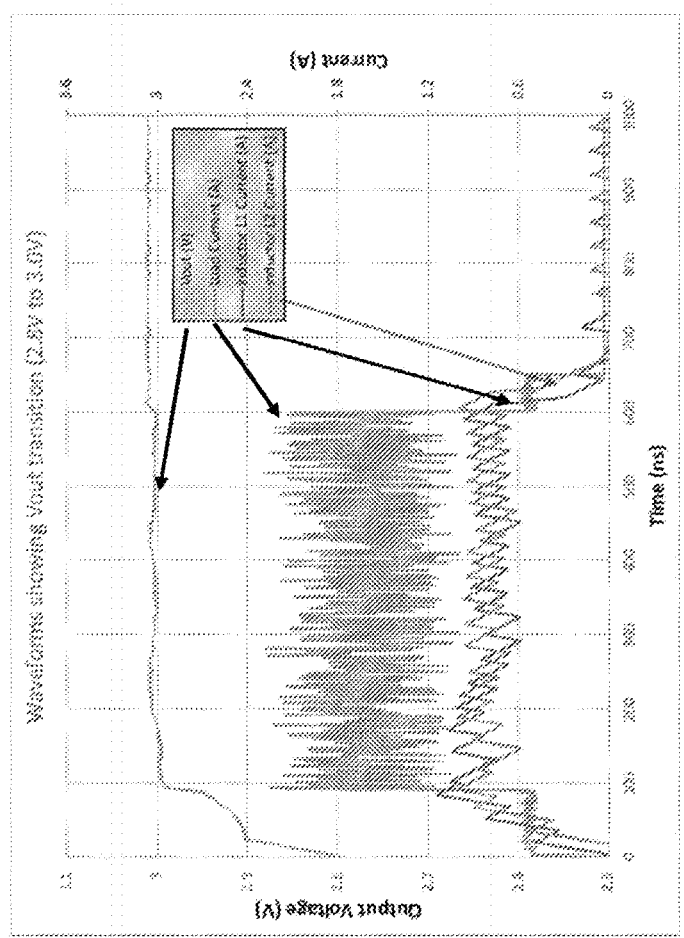
FIG. 13 illustrates waveforms showing voltage transition and delivering 500 us payload. Both CCM and DCM (starting from T=700 ns) mode of operation shown (PX, PY, and PZ switches used)

FIG. 13 shows waveforms showing voltage transition and delivering 500 ns payload. Both CCM and DCM (starting from T=700 ns) mode of operation are shown (PX, PY, and PZ switches used). Here, the following events are observed at respective time values:

Time=1 ns through 24 ns (PX switch is used)
Time=88 ns, (Digital load information for anticipated load increase)
Time=90 ns through 110 ns, (abruptly reduce duty cycle)
Time=Multiple instances -110 ns thru 600 ns, (abruptly increase duty cycle)
Time=606 ns through 615 ns, (abruptly reduce duty cycle detected without digital load information).

Start-Up (Calibration and Training)

If we consider the embodiment shown in FIG. 7 and controller with a predictor unit and an artificial intelligence unit with state estimation as output use EKF coefficients and state machine to determine the most likely state of the system, calibration of the system is performed during start-up and determines the component variation of inductor and capacitors in the final product which can be up to 50%.

The process variations can also be considered at start-up but typically the transistor ON resistance as well as the references for voltage and current measurements are trimmed for each chip during final production testing at manufacturing facilities before and/or after assembly.

A process flow for calibration of the digital signal processing control and training of the neural network (NN) may comprise:
Inductor and capacitor calibration
Adding digital load to the calibration during OFF mode
Start training of the NN in OFF mode
Set STANDBY mode target voltage and continue training NN during ramp up
Adding digital load to the calibration during STANDBY mode
Adding digital signal processing and digital load information to the training of NN
Continue training NN for better accuracy and efficiency
Continue training during run time: Use of Mode and Duty Cycle Control and State Estimation
Training and Inferencing Examples The digital duty cycle control gain and loop bandwidth are designed to guarantee certain accuracy and the error is predictable. Depending on the controller architecture chosen this can be observed but not easily corrected with a linear control system. In the example below and artificial intelligence unit with machine learning capability is used to modify the duty cycle code to improve the accuracy of the output voltage regulation eliminating recognizable patterns that are due to the constraints of the control system.

The training of the neural network is done by previous simulations and the first few layers of the deep neural network is re-trained during the first 500 time sequence and inferencing started at time sequence 570. Note that the training of the first few layers of the NN can continue even after inferencing by using parallel structures.

Figure 14:
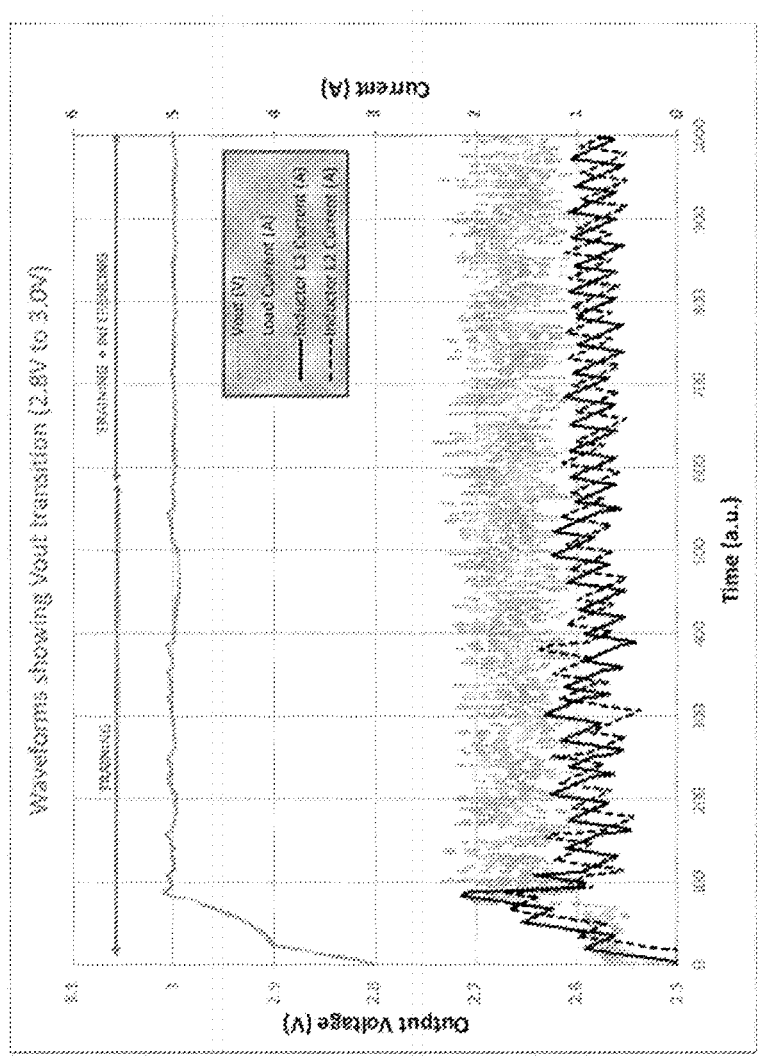
FIG. 14 illustrates a waveform showing 500 us initial training followed by the real-time inferencing and continued training starting at t=580 us.

The waveforms shown in FIG. 14 above are from controlled simulations, showing initial training followed by the real-time inferencing and continued training starting at time sequence 570. In reality, the operating conditions will be changing, the components will have mismatch and variation over time and with temperature. There will also be measurement error from voltage and current monitor circuits. The implementation will require a higher level orchestration of the controller input and outputs and in-situ real-time training of the Neural Network.

We now turn to provide still further details of an embodiment which provides real time training with a small controller neural network and a higher level orchestration of self-organizing, self-optimizing power solution.

Switching regulator controllers with voltage and current monitor can be designed for very high accuracy and high efficiency. There are challenges in implementation due to the accuracy of current measurement accuracy, time delay due to bandwidth limitations of the closed loop controller, and changes in external operating conditions that are faster than controller bandwidth. Each implementation consists of a calculated compromise between various specifications such as accuracy versus efficiency.

Figure 15:
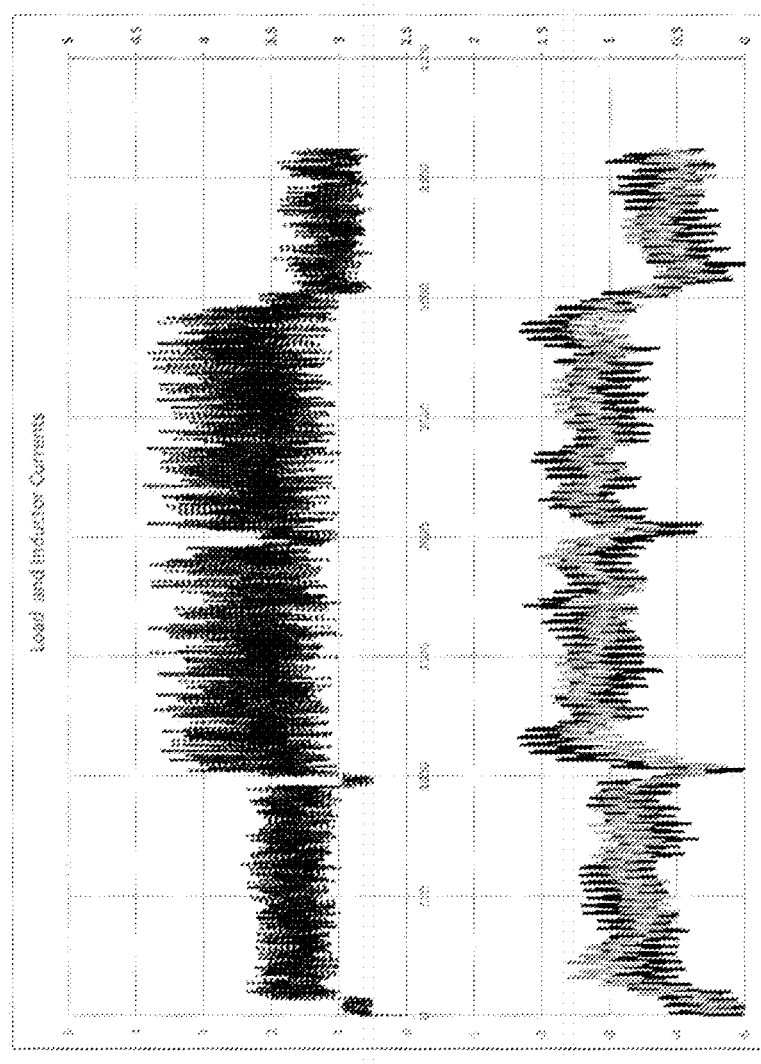
FIGS. 15 and 16 illustrate waveforms of untrained controller output with mismatched components and input supply noise and load current variations.
Figure 16:
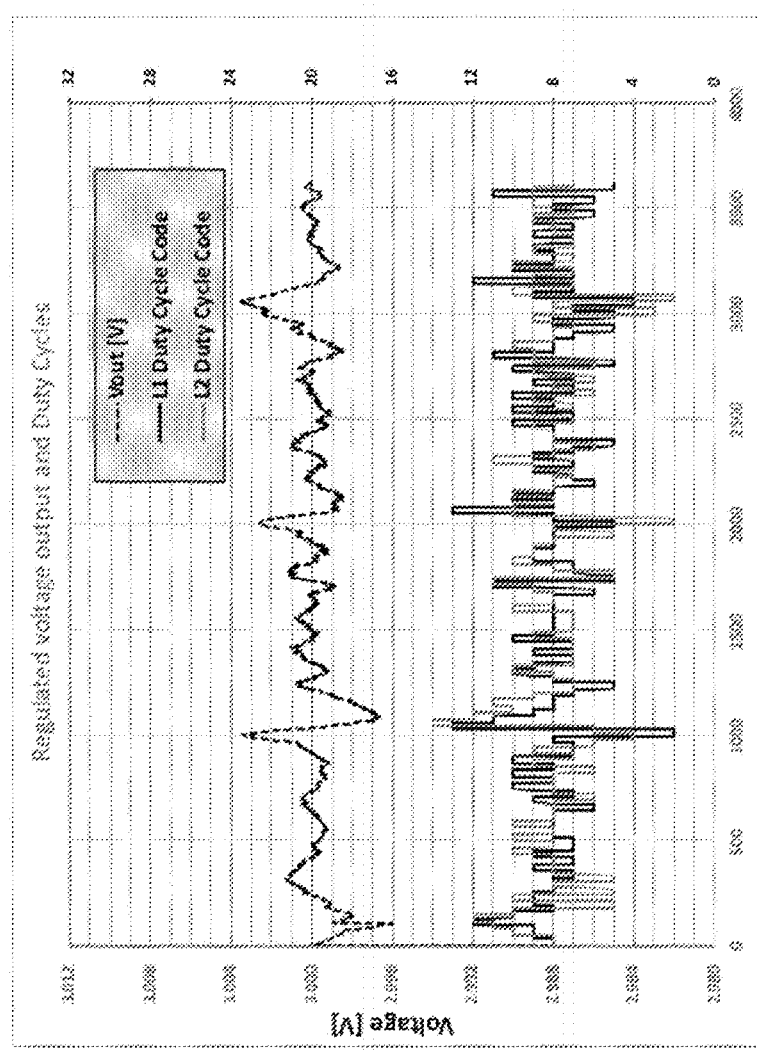

This disclosure uses the input and output of several controller schemes as well as a deep neural network and determines the best option (or combination of the outputs of these different controllers). The untrained controller output with mismatched components and input supply noise and load current variations simulated and the waveforms provided in FIGS. 15 and 16 below. This example is provided for CCM mode of operation but it can be extended for DCM.

Figure 17:
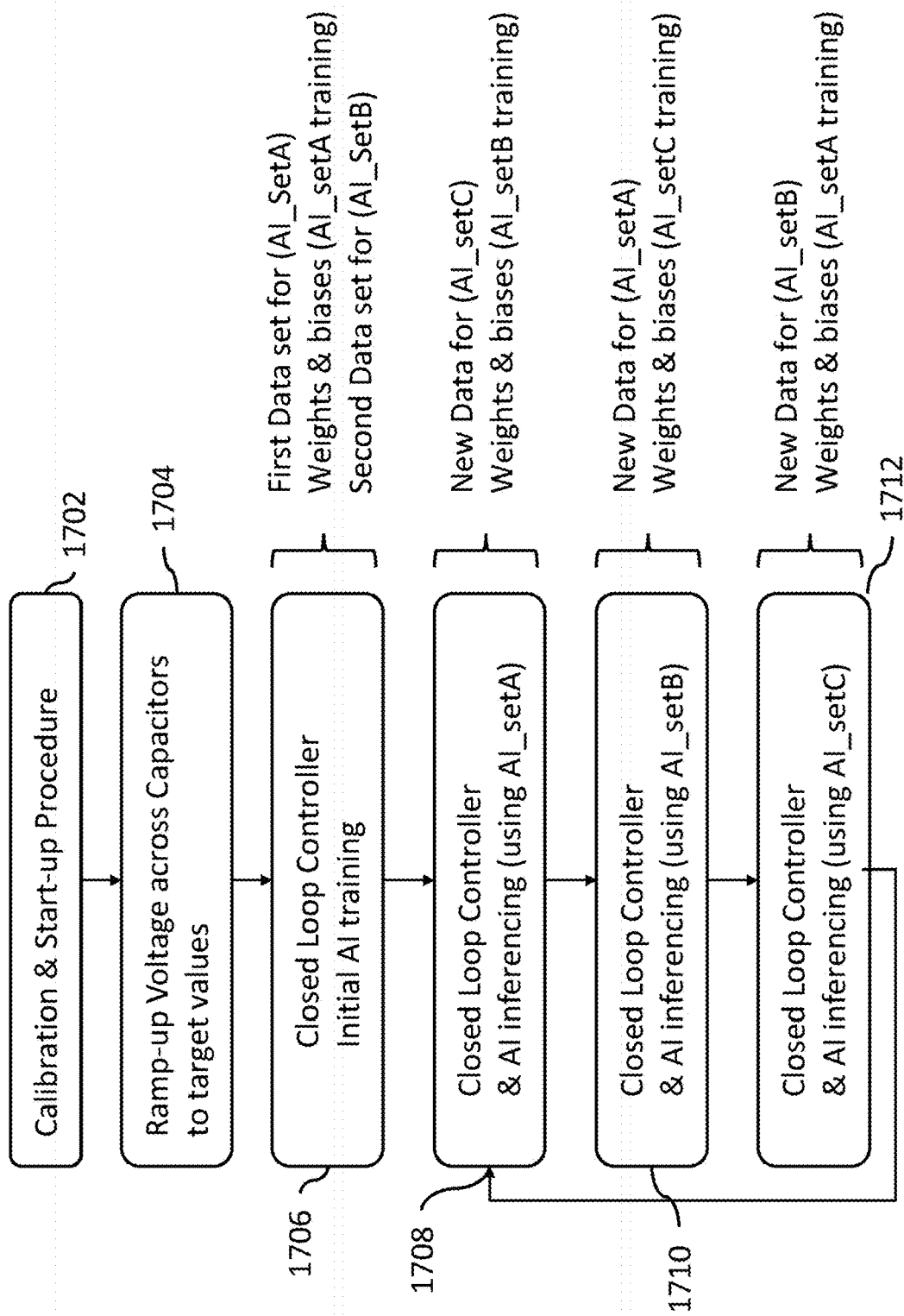
FIG. 17 illustrates a machine learning and closed loop controller operation.

In the following example time scale is given for 1 GHz clock, it can be changed as required based on the component values, power constraints, and other considerations. The training is performed every 512 nsec using the 16 duty cycle codes and the corresponding voltage and current measurements. The 512 nsec data is then processed and training data set is obtained with "hindsight". The trained neural network is then put in operation for the real-time data. Note that the weights obtained are from data set that is obtained 1 msec (2×512 nsec intervals). The process flow is shown in FIG. 17, which shows various steps carried out by a closed loop controller.

After an initial calibration and startup procedure 1702, the circuit's capacitors are ramped up to target voltages 1704. Then, the neural net is trained in a circular fashion, optionally with fixed time periods. Throughout the course of a first time period, a first set of data is collected, a second set of data is trained, and a third set of data is applied. Then, after the first time period has ended, the sets of data are cycled so that throughout the course of a subsequent time period, a new set of data is collected, the previously collected data is trained, and the previously trained data is applied. This process repeats for successive sets of data. For each set of data, there are three steps: obtaining the data, training (weights and balances), and inferencing.

This circular process is illustrated in the figure, where initial AI training 1706 is performed, which obtains a first set of AI weights and biases AI_SETA and a second set of AI weights and biases AI_SETB. Then, the first weights AI_SETA are applied 1708. At the same time, new data are obtained for a third set of AI weights and balances AI_SETC for the next block and AI_SETB training.

For the cascaded two step regulator shown in FIG. 7 above, initial calibration is performed with the switches set as listed in the table below. In the OFF state CA, CB and Cout are at 0V and P0 is OFF. During the initial Ramp CA is charged to Vin/2 utilizing P0 as LDO (for efficiency combination of switching regulator action of P2/N2 and PX as digitally controlled LDO can be used instead of direct charging of the capacitor CA which will involve CV^2 loss. In that case, attention needs to be given to ensure voltage across the N1 and N2 switches remain within safe limits e.g. Vin/2)

| Switch | OFF STATE | CA RAMP | CA/CB Cal | CB Ramp RegA Cal | Cout Cal | Cout Ramp RegB Cal | Notes |
|---|---|---|---|---|---|---|---|
| RegA_P0 | OFF | LDO Vin/2 | OFF | SW | OFF | SW | P0 gate bias controlled during CA RAMP avoid excessive current |

| Switch | OFF STATE | CA RAMP | CA/CB Cal | CB Ramp RegA Cal | Cout Cal | Cout Ramp RegB Cal | Notes |
|---|---|---|---|---|---|---|---|
| RegA_N1 | ON | ON | OFF | SW | OFF | SW | |
| RegA_PZ | ON | ON | ON | OFF | ON | OFF | |
| RegA_P2 | OFF | OFF | OFF | SW | OFF | SW | |
| RegA_N2 | ON | ON | OFF | SW | OFF | SW | |
| RegA_PY | ON | ON | ON | OFF | ON | OFF | |
| RegA_PX | ON | OFF | Digital Code | OFF | OFF | OFF | PX code during CA/CB Cal explained below |
| RegB_N1 | ON | ON | ON | ON | OFF | SW | |
| RegB_PZ | ON | ON | ON | ON | ON | OFF | |
| RegB_P2 | OFF | OFF | OFF | OFF | OFF | SW | |
| RegB_N2 | ON | ON | ON | ON | OFF | SW | |
| RegB_PY | ON | ON | ON | ON | ON | OFF | |
| RegB_PX | OFF | OFF | OFF | OFF | Dig_Code | OFF | |

CA/CB Cal Procedure
  PX is trimmed to within 1% of target resistor values (this can be done during ATE in FAB)
  V_CA_START=Vin/2, V_CB_START=0V
  Apply PX_Code for the durations as specified in the table below

| PX_Code | Time | PX_Ron | VA_Dig | VB_Dig |
|---|---|---|---|---|
| 2 | 32 | 25.6 | 12 | −5 |
| 4 | 32 | 12.8 | 13 | −3 |
| 6 | 32 | 8.5 | 15 | −2 |
| 6 | 64 | 8.5 | 20 | 3 |
| 6 | 96 | 8.5 | 25 | 7 |
| 6 | 128 | 8.5 | 30 | 11 |
| 6 | 160 | 8.5 | 35 | 15 |
| 8 | 32 | 6.4 | 17 | 0 |
| 8 | 64 | 6.4 | 23 | 5 |
| 8 | 96 | 6.4 | 30 | 11 |
| 8 | 128 | 6.4 | 36 | 16 |
| 8 | 160 | 6.4 | 43 | 22 |
| Total | 1024 | ns | @ 1 GHz clock | |

| | Slope | Offset | Cap Est (nF) | Cap Act (nF) |
|---|---|---|---|---|
| Reg_A | 25.7 | 10 | 8980 | 9000 |
| Reg_B | 21.8 | −6 | 10584 | 10500 |

The calculation uses slope of the measurements and able to remove comparator offset from the data. In the example above the offset is calculated as 10 mV and −6 mV for the corresponding CA and CB voltage measurements (VA_Dig, VB_Dig) and the capacitor values are estimated to better than single measurement accuracy and offset error.

CB value included the additional capacitor for the L1A inductor nodes (RegA_N1 is OFF, RegA_N2 is OFF, RegA_PZ is ON, RegA_PY is ON)

The measurement is completed within 1 msec

CB RAMP and Reg_A Calibration

Following CA/CB calibration Reg_A is operated as a switching regulator to charge CB voltage to Vin/4. During this ramp up Reg_A calibration is performed as outlined below;

The starting voltage for CB is around 150 mV depending on the calibration of CA/CB as outlined above P0/N1 runs at a fixed 6.25% duty cycle, while P2/N2 is in STANDBY (PY is ON, P2/N2 is OFF) until L1 current reaches 2 A (determined by VA_Dig=7+/−1→2 A+/−280 mA, based on the CA/CB calibration table above)

L1 is put in STANDBY and L1 current is reduced to zero with PZ ON and P0/N1 OFF. Confirmed by measurement of CB voltage remaining constant for 32 nsec For P2/N2 starts running at 6.25% duty cycle while P0/N1 is in STANDBY until L2 current reaches 2 A. (determined by VB_Dig=6+/−1→2 A+/−330 mA, based on the CA/CB calibration table above)

L2 is put in STANDBY and L1 current is reduced to zero with PZ ON and P0/N1 OFF. Confirmed by measurement of CB voltage remaining constant for 32 nsec Reg_A Calibration Switching operation for Reg_A starts with initial two cycles based on Vin and target V_CB (Vin/4). The consecutive duty cycles are determined by the solution of the matrix equation as outlined below $$X1 = \Delta I \max (100\% \text{ duty cycle}) = (VI - V0) * \frac{T\text{ Period}}{L}$$

$$X2 = \Delta I \min (0\% \text{ duty cycle}) = -V0 * \frac{T\text{ Period}}{L}$$

$$\Delta I = X1 * t_{hs} + X2 * t_{ls}$$

$$t_{period} = t_{hs} + t_{ls}$$

$$A = \begin{bmatrix} 1 & 1 \\ X1 & X2 \end{bmatrix}, T = \begin{bmatrix} t_{hs} \\ t_{ls} \end{bmatrix}, V = \begin{bmatrix} t_{period} \\ \Delta I \end{bmatrix}, V = A * T$$

Given the target inductor current value and the required change in current $\Delta I$, duty cycle can be calculated using the inverse of matrix A as below $T = A^{-1} * V$, where $$V = \begin{bmatrix} 1 \\ \Delta I \end{bmatrix},$$

$$A^{-1} = \begin{bmatrix} -\frac{X2}{X1 - X2} & \frac{1}{X1 - X2} \\ \frac{X1}{X1 - X2} & -\frac{1}{X1 - X2} \end{bmatrix}$$

In the equations above the period is normalized to 1 hence t_hs gives the duty cycle. Variables X1, X2, and the corresponding A matrix calculated using the CB ramp calibration and the voltage measurements V_CA and V_CB.

Calculated X1, X2 values and corresponding current and voltage measurements are provided in the table below

| V_CA | V_CB | L_value CAL | CB CAL | X1 | X2 | NOTES |
| --- | --- | --- | --- | --- | --- | --- |
| 11855 | 124 | PRE-CAL | 6 | 7.00 | −0.25 | |
| 12000 | 2850 | 122-144 nH | 6 | 6.75 | −2.00 | L1 = 130 nH |
| 12000 | 2850 | 158-202 nH | 6 | 5.00 | −1.50 | L2 = 180 nH |

Figure 18:
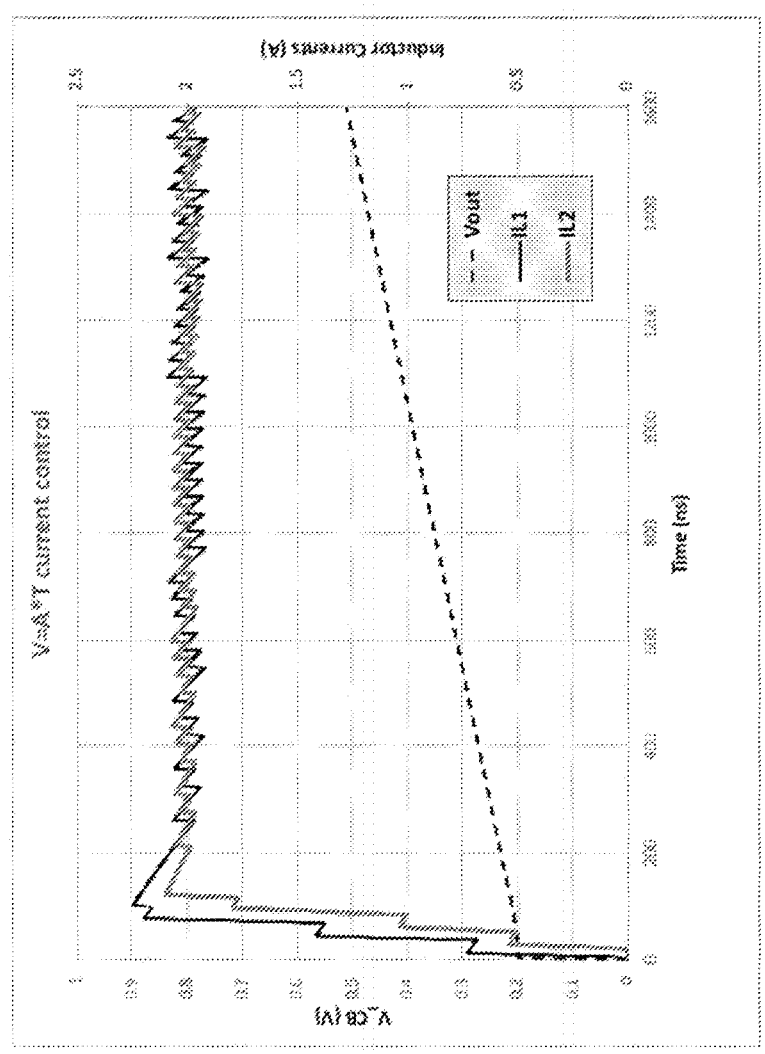
FIG. 18 illustrates Reg_A Calibration CB_RAMP using V=A*T matrix current control.
Figure 19:
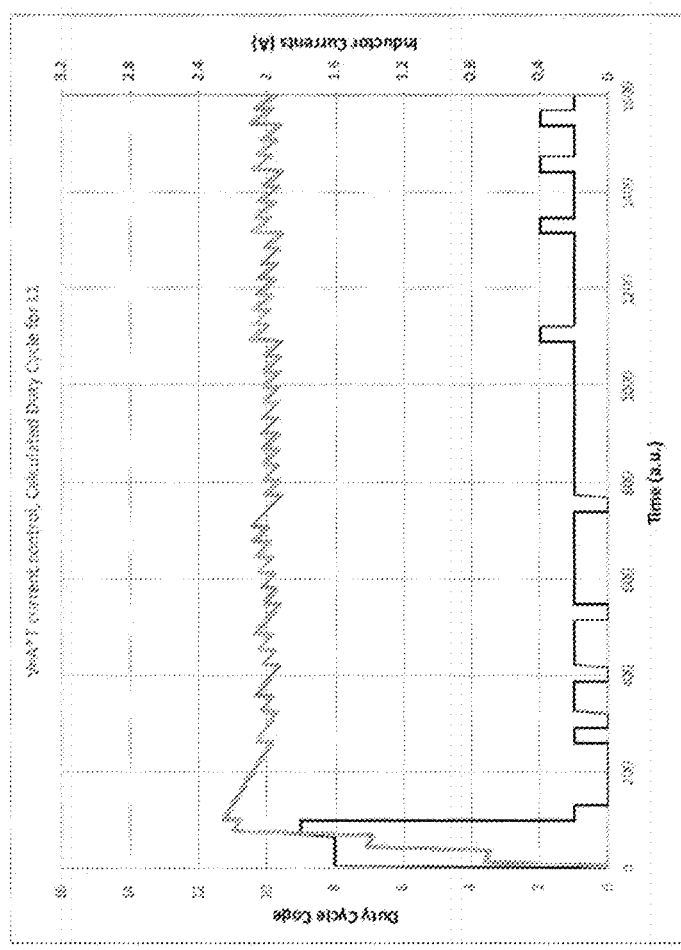
FIG. 19 illustrates V=A*T matrix current control and the calculated Duty Cycle Code for L1.
Figure 20:
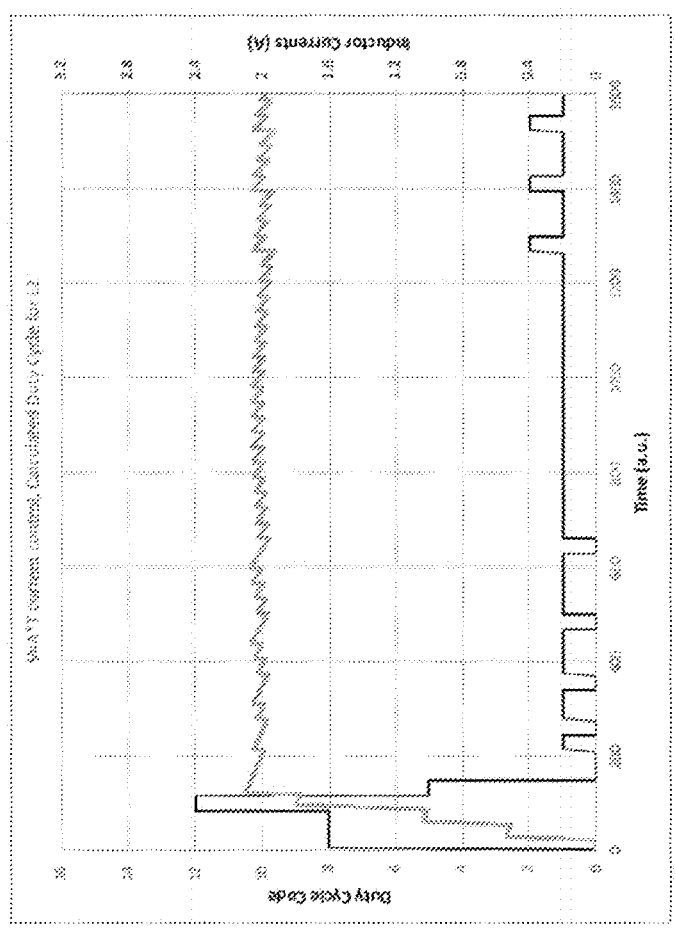
FIG. 20 illustrates V=A*T matrix current control and the calculated Duty Cycle Code for L2.

V=A*T current control loop described above is applied with fixed 2 A target until CB voltage is within 5% of the final target value (i.e. Vin/4). The inductor currents and the corresponding duty cycles are given in FIGS. 18, 19 and 20 at the beginning of CB ramp operation.

Once the CB voltage reaches 5% of the final target value, Reg_A is set to STANDBY mode and COUT Cal procedure is started.

COUT Cal procedure is similar and use corresponding Reg_B switches and Dig_Code for RegB_PX starting from V_CB=Vin/4 and V_Cout=0V.

COUT RAMP and Reg_B calibration is similar to the procedure CB RAMP and REG_A Calibration as described above.

A matrix equation like the above or similar is a novel approach to derive duty cycle based on VI, V0 to determine the coefficients X1 and X2 which can be repeated at periodic intervals. This does not need to be updated every time. In our example we update X1 and X2 in 1 msec intervals and use the calculated inv(A) matrix to derive duty cycles every 32 nsec for the desired change in current output (Delta_I) for each phase (phase1 and phase2 calculation done separately interleaved every 16 nsec).

There can be preset trained NN configurations from simulations to recognize special circumstances.

During application of artificial intelligence, a high level logic block can be provided to monitor seemingly wrong decisions, which can be categorized; for example, a first category of wrong decision could be determined if a voltage error is positive and inductor current is increased (or voltage error is negative and the inductor current is decreased), and a second category of wrong decision could be determined if a voltage error is negative and inductor current is not increased enough where the duty cycle is set to less than maximum allowed value of 50%.

If there are a number of consecutive wrong decisions, preferably above a given threshold, then the AI block can be taken offline for the relevant time sequence; or swapped out for an alternative AI block. The threshold may be individually set for each category and thus may vary.

As an example, referring to the categories above, if there are three consecutive wrong decisions of the first category type or six consecutive wrong decisions of the second category type, then the AI block needs to be taken off line for that time sequence. Alternatively, a different AI block with preset configuration can be brought back to operation (obtained by simulations for a safe response). This is anticipated when load conditions change requiring CCM to DCM transitions or during dynamic voltage scaling events which should be communicated by the digital load. It can also happen unexpectedly due to external events such as power surge, battery removal, or shorts/opens developing with the external components.

Various improvements and modifications can be made to the above without departing from the scope of the disclosure.

The invention claimed is:

1. A system comprising:
an electronic circuit with one or more controllable components and which provides a functionality; and
a circuit control for providing control signals for operating the controllable components;
wherein the circuit control comprises a controller and an artificial intelligence component which cooperate to provide the control signals;
wherein the circuit providing the functionality is provisioned with one or more supplementary control elements which can be controlled by the circuit control or by a component external to the system to modify the functionality;
wherein the supplementary control element is configured to generate a complementary output correction to reduce a difference between a current value of the functionality and a target value of the functionality;
wherein the artificial intelligence component comprises a neural network; wherein the neural network is trained in-situ during the operation of the circuit in a circular fashion, alternating such that one set of data is collected, the second set of data is used for training, and the third set of data is applied to the control which was previously collected and used for training during the previous time period.

2. The system of claim 1, wherein the controller and artificial intelligence component are provided as part of the same integrated circuit.

3. The system of claim 1, wherein the artificial intelligence component monitors the performance of the functionality and feeds that back to the circuit control.

4. The system of claim 1, further comprising a predictor unit that estimates a state of the system.

5. The system of claim 1, wherein the neural network is trained during start up of a circuit.

6. The system of claim 1, wherein the neural network is trained on simulation data of expected scenarios.

7. The system of claim 1, wherein the neural network comprises a deep learning architecture with purpose driven hidden layers handling state transitions and control of the circuit.

8. The system of claim 1, wherein the electronic circuit is a power supply circuit and the functionality is to provide a controlled power output for a load.

9. The system of claim 1, wherein the system comprises a physical copy of the system and a digital twin of the physical copy, wherein the physical copy and the digital twin are configured to exchange data between each other.

10. The system of claim 9, wherein the digital twin receives one or more data from the physical copy of the artificial intelligence component of the circuit control.

11. The system of claim 10, wherein the digital twin is configured to determine what changes should be applied by the supplementary control elements to modify the functionality.

12. In an electronic system, a method of controlling an electronic circuit with one or more controllable components and which provides a functionality, the method comprising:
providing control signals using a circuit control for operating the controllable components;
wherein the circuit control comprises a controller and an artificial intelligence component which cooperate to provide the control signals, wherein the artificial intelligence component comprises a neural network and wherein the circuit providing the functionality is provisioned with one or more supplementary control elements which can be controlled by the circuit control or by a component external to the system to modify the functionality;

generating with the supplementary control element a complementary output correction to reduce a difference between a current value of the functionality and a target value of the functionality; and training the neural network in-situ during the operation of the circuit in a circular fashion, alternating such that one set of data is collected, the second set of data is used for training, and the third set of data is applied to the control which was previously collected and used for training during the previous time period.

13. The system of claim 1, wherein the electronic circuit is a power supply circuit which comprises a controller and an artificial intelligence component which cooperate to optimize the operation of the power supply circuit.

14. The system of claim 13, wherein the system further comprises a feedback path coupling the output of the electronic circuit to at least one of the controller and the artificial intelligence component; and wherein the controller and the artificial intelligence component are configured to cooperate to optimize the operation of the power supply circuit using a measured error communicated via the feedback path.

15. The system of claim 1, wherein the electronic circuit is a circuit for a voltage regulator, comprising:
an input node connected to a first switch having a first side connected to an input voltage and a second side connected to the input node;
an input capacitor having a first side connected to the input node and a second side connected to a first switching node;
a second switch having a first side connected to the first switching node and the second side connected to ground;
a first inductor having a first side connected to the first switching node and a second side connected to the output node;
a third switch having a first side connected to the input node and a second side connected to a second switching node;
a fourth switch having a first side connected to the first switching node and a second side connected to ground;
a second inductor having a first side connected to the second switching node and a second side connected to the output node;
a fifth switch with digital code controlled gate having the switch connected between the input node and output node where the digital code determines the on resistance of the switch;
a sixth switch having a first side connected to the second switching node and a second side connected to the output node;
a seventh switch having a first side connected to the first switching node and a second side connected to the output node.

16. The system of claim 1, wherein the electronic circuit comprises cascaded voltage regulators where an output node of a first regulator is connected to an input node of a second regulator; and wherein the first regulator comprises the voltage regulator and the second regulator comprises the voltage regulator except that the first switch is omitted.

17. The system of claim 16, wherein an on resistance of the fifth switch of the first regulator and the voltage measurement of the input and output nodes are used to calibrate the component value of the output capacitor of the first regulator with all the switches set appropriately as follows;
each of the first switch, second switch, third switch, fourth switch of the first regulator are off;
each of the sixth switch, seventh switch of the first regulator are on;
the first switch of the second regulator is omitted;
each of the second switch, fourth switch, sixth switch, seventh switch of the second regulator are on;
each of the third switch, fifth switch of the second regulator are off.

18. The system of claim 16, wherein the on resistance of the fifth switch of the second regulator and the voltage measurement of input and output nodes are used to calibrate the component value of the output capacitor of the second regulator with all the switches are set appropriately as follows;
each of the first switch, second switch, third switch, fourth switch, fifth switch of the first regulator is off;
each of the sixth switch, seventh switch of the first regulator are on;
the first switch of the second regulator is omitted;
each of the sixth switch, seventh switch of the second regulator are on; and
each of the second switch, third switch, fourth switch of the second regulator are off.

19. The system of claim 16, wherein the inductor values of the first and second regulators are calibrated during start-up operation following the calibration of capacitor values.

* * * * *